United States Patent
Alleysson et al.

(10) Patent No.: US 11,408,771 B2
(45) Date of Patent: Aug. 9, 2022

(54) METHOD FOR MEASURING A COLOUR SPACE SPECIFIC TO AN INDIVIDUAL AND METHOD FOR CORRECTING DIGITAL IMAGES DEPENDING ON THE COLOUR SPACE SPECIFIC TO THE INDIVIDUAL

(71) Applicants: CENTRE NATIONAL DE LA RECHERCHE SCIENTIFIQUE, Paris (FR); UNIVERSITE GRENOBLE ALPES, Saint Martin d'Heres (FR)

(72) Inventors: David Alleysson, Moirans (FR); David Meary, Grenoble (FR)

(73) Assignees: CENTRE NATIONAL DE LA RECHERCHE SCIENTIFIQUE, Paris (FR); UNIVERSITE GRENOBLE ALPES, Saint Martin d'Heres (FR)

( * ) Notice: Subject to any disclaimer, the term of this patent is extended or adjusted under 35 U.S.C. 154(b) by 0 days.

(21) Appl. No.: 17/272,181

(22) PCT Filed: Aug. 2, 2019

(86) PCT No.: PCT/EP2019/070904
§ 371 (c)(1),
(2) Date: Feb. 26, 2021

(87) PCT Pub. No.: WO2020/048701
PCT Pub. Date: May 12, 2020

(65) Prior Publication Data
US 2021/0199505 A1 Jul. 1, 2021

(30) Foreign Application Priority Data
Sep. 4, 2018 (FR) ...................................... 1857928

(51) Int. Cl.
*G09G 5/10* (2006.01)
*G01J 3/50* (2006.01)
(Continued)

(52) U.S. Cl.
CPC .............. *G01J 3/506* (2013.01); *G09G 3/006* (2013.01); *G09G 3/2003* (2013.01); *G09G 2320/0666* (2013.01); *G09G 2340/06* (2013.01)

(58) Field of Classification Search
CPC ....... G01J 3/506; G09G 3/006; G09G 3/2003; G09G 2320/0666; G09G 2340/06
(Continued)

(56) References Cited

U.S. PATENT DOCUMENTS

| 9,911,395 B1 * | 3/2018 | Townsend ............. G06F 1/1686 |
| 2004/0071366 A1 * | 4/2004 | Zhang .................. H04N 1/4446 382/284 |

(Continued)

OTHER PUBLICATIONS

Cropper, S., et al., "The detection of motion in chromatic stimuli: first-order and second-order spatial structure," Vision Research 45, 2005, pp. 865-880.
(Continued)

*Primary Examiner* — Jennifer T Nguyen
(74) *Attorney, Agent, or Firm* — Greer, Burns & Crain, Ltd

(57) ABSTRACT

A method for constructing a colour space specific to an individual viewing a colour image on a display device, including at least the following steps: a first step of measuring an emitted spectral radiance; a second step of constructing a Euclidean colour space of the lights emitted by the display device; a third step of measuring, by computer, a luminance vector field perceived by the individual; a fourth step of constructing a model corresponding to the individual's perception of the colours.

11 Claims, 19 Drawing Sheets

(51) Int. Cl.
*G09G 3/00* (2006.01)
*G09G 3/20* (2006.01)

(58) Field of Classification Search
USPC .......................................... 345/960
See application file for complete search history.

(56) References Cited

U.S. PATENT DOCUMENTS

2013/0154903 A1* 6/2013 Kim .................... H04N 1/6055
345/1.1
2015/0201185 A1* 7/2015 Hyodo .................. H04N 13/15
348/51

OTHER PUBLICATIONS

Farup, I., "Hyperbolic geometry for colour metrics," Optics Express 22(10), 2014, pp. 12369-12378.
French Search Report Received for French Application No. 1857928 dated Apr. 18, 2019.
International Search Report and Written Opinion Received for PCT/EP2019/070904 dated Nov. 14, 2019.
Stiles, W.S., et al., "N.P.L. Colour-matching Investigation: Final Report (1958)," Optica Acta: International Journal of Optics 6(1), 1959, 27 pages.
Webster, M., et al., "Motion Minima for Different Directions in Color Space," Vision Research 37(11), 1997, pp. 1479-1498.

* cited by examiner

METHOD FOR MEASURING A COLOUR SPACE SPECIFIC TO AN INDIVIDUAL AND METHOD FOR CORRECTING DIGITAL IMAGES DEPENDING ON THE COLOUR SPACE SPECIFIC TO THE INDIVIDUAL

BACKGROUND

The present invention is situated within the field of image processing and in particular within the field of colour rendering by different display means.

The invention proposes a method for measuring a colour space specific to an individual as well as a method for correcting digital images as a function of the colour space specific to the individual.

The invention seeks to define a colour space metric for a user facing a display device.

For a long time, colour vision space has been constructed according to a concept of visual equivalence, or metamerism, between monochromatic lights.

Monochromatic lights have been used in the field of photometry to measure the overall sensitivity of the eye according to the different wavelengths of the light.

Furthermore, it has been demonstrated that the eye does not have constant sensitivity over all the wavelengths of visible light.

As regards colour vision in the strict sense of the term, the determination of a colour space is based on an experiment called "colour matching experiment", described in particular by Siles, W. S. & Bruch J. M. in the following article: "NPL colour-matching investigation: final report". Thus a colour vision space, defined by an RGB vector base, was determined according to the wavelengths of the three primary colours, namely red, green and blue. The vectors according to the primary colours were transformed linearly into positive XYZ spectral functions. The XYZ spectral functions were standardized by the International Commission on Illumination according to several successive CIE Standards.

This parametrization by wavelength of the colour space presents several disadvantages. A first disadvantage is that the equipment for carrying out the measurements is very difficult to calibrate and the experiments are very demanding to conduct. Another disadvantage is that even if the bases of construction of the monochromatic lights are very accurate in terms of wavelength, it is very difficult to manage the intensity thereof. This therefore in fact excludes the non-linear aspect of the colour vision functions according to its intensity.

SUMMARY

A purpose of the invention is in particular to propose a method for compensating a display system for particular features of a colour space specific to an individual facing a particular display unit.

To this end, the present invention proposes a method, implemented by computer, for the construction of a colour space specific to an observer viewing a colour image on a display device connected to said computer. Said method comprises at least the following steps:
- a first step of measuring spectral radiances emitted by the display device and captured by a radiance measurement device;
- a second step of constructing an affine model of the lights produced by the display device in an orthogonal Euclidean colour space of the display device based on the measurements of spectral radiances;
- a third step of measuring a luminance vector field perceived by the observer placed in front of the display device and subjected to a stimulus defined in the orthogonal Euclidean colour space of the display device;
- a fourth step of constructing a hyperbolic space representing a colour vision space specific to the observer placed in front of the display device based on the measured luminance vector field.

The spectral radiance measurements are carried out for several digital values DV representing instructions given to the display device by a graphics card present in the computer. The instructions make it possible to display an image on each colour channel of the display device. The affine model of the lights produced by the display device can be defined as a function of the digital values DV and the gain values of the display device.

The second step of constructing an affine model can comprise in particular:
- a step of calculating prototype functions of the display device for each colour channel, as a function of the measured spectral radiances;
- a step of calculating gains of the display device for each colour channel, as a function of the measured spectral radiances;
- a step of interpolating the gains for each colour channel of the display device between the measured spectral radiances;
- a step of determining a nonlinear vector function from the space of the digital values DV to the space of the gains of the display device.

Calculation of the prototype functions can be carried out by a method from among:
- use of the maximum values of the radiance measurements on each colour channel;
- rank-one decomposition into singular values and vectors of a matrix composed of the values of the spectral radiance measurements for each colour channel.

The step of transformation of the orthogonal Euclidean colour space into an affine space can be carried out by a method from among:
- a first method called by decorrelation;
- a second method by canonical spectral projection;
- a third method called Gram-Schmidt method;
- a fourth method by decomposition into singular values.

The step of measuring a luminance vector field perceived by an observer placed in front of the display device can be carried out by a computer equipped with an interface between the computer and the observer and connected to the display device. Said computer implements a method of the "minimum motion photometry" type applied to the observer to whom a stimulus is presented, defined within the orthogonal Euclidean colour space of the display device.

The first measuring step can be implemented by a spectrophotometer.

The invention also proposes a method, implemented by computer, for the correction of digital images as a function of a colour space specific to an observer viewing a colour image on a display device connected to the computer. Said method comprises at least the following steps:
- constructing the colour space specific to the observer viewing a colour image on said display device connected to said computer;
- determining a function for conversion of points of an image displayed by the display device, said points being expressed in the orthogonal Euclidean colour space of the display device, into points of a hyperboloid calculated as a surface of constant luminance based on the luminance vector field, expressed in the hyperbolic space representing the colour vision space specific to the observer;

modifying parameters of the conversion function in order to adapt the image to the observer.

Each point $x=[x_a, x_b, x_c]^T$ of the orthogonal Euclidean colour space of the display device can be transformed into a point $z=[z_1, z_2, z_3]^T$ in the hyperbolic space representing the colour vision space, specific to the observer, according to the parameters (k, t, θ), such that:

$$k = \sqrt{(x-X0)^T R(x-X0)}$$

$$z = \begin{bmatrix} k\,\sinh(t)\cos(\theta) \\ k\,\sinh(t)\sin(\theta) \\ k\,\cosh(t) \end{bmatrix}$$

with $t = \operatorname{arccosh}\left(\frac{z_3}{k}\right); \theta = \arctan\left(\frac{z_2}{z_1}\right)$ The parameter k can be adapted by setting it to a constant value in order to carry out an adaptation of the image presented by the display device at a constant luminance level for the observer placed in front of the display device.

The parameter k can alternatively be adapted by reducing the variance thereof in order to diminish the adaptation of the observer to the luminance difference between the different regions of the image.

The present invention also relates to a device for measuring a colour space specific to an individual and for correcting digital images as a function of the colour space specific to the observer, characterized in that it comprises:
- a device for displaying a colour image;
- a device for measuring a spectral radiance emitted by the display device;
- a device for calculating a colour space specific to an individual based on the measured spectral radiance and the displayed colour image, and a method for correcting digital images, comprising at least: a calculation processor, a device for recording and storing data, an interface with the measurement device and an interface with the display device, an interface with the observer.

The invention also relates to a computer program product comprising instructions which, when the program is executed by a computer, control the latter to implement the steps of the method for correcting images.

The invention also relates to computer-readable recording media comprising instructions which, when they are executed by a computer, control the latter to implement the steps of the method for correcting images.

BRIEF DESCRIPTION OF THE DRAWINGS

Other advantages and characteristics of the invention will become apparent on examination of the detailed description of several embodiments that are in no way limitative, and from the attached drawings, in which.

DETAILED DESCRIPTION

By way of example application, the present invention relates to a method 1 for compensating a display system adapted to the features specific to a colour space of an individual, or observer, facing a particular display unit. The present method comprises several principal steps, shown in FIG. 1. These different steps can be applied to several different fields.

A first general step 2 can be a step of constructing a radiometric Euclidean colour space provided with a scalar product, with an orthogonality property, associated with a display unit, or particular display device, such as a computer screen.

A second step 3 can be a step of measuring the field of luminance vectors viewed by a particular observer in the Euclidean space defined above.

A third step 4 can be a step of constructing a hyperbolic space, based on the vector field, representative of the colour vision space of the observer facing the display unit.

The first, second and third steps form parts of a method, called construction method, of a colour space specific to an individual viewing a colour image on a display device.

A fourth step 5 can be a step of compensation of the digital images adapted to said observer viewing the display unit.

The fourth step 5 can be different according to the particular embodiments.

The fourth step can form part of a method for correcting digital images as a function of a colour space specific to an individual, also comprising a step prior to the fourth step 5: a step of implementing the method for the construction of a colour space specific to an individual viewing a colour image on a display device.

The different steps of the method according to the invention are described in greater detail hereinafter.

The present invention advantageously uses a particular property of the colour metric space of a human observer: namely that this metric space is hyperbolic. The axes and the curves of this metric space depend on a particular observer facing a particular display device.

Figure 1:
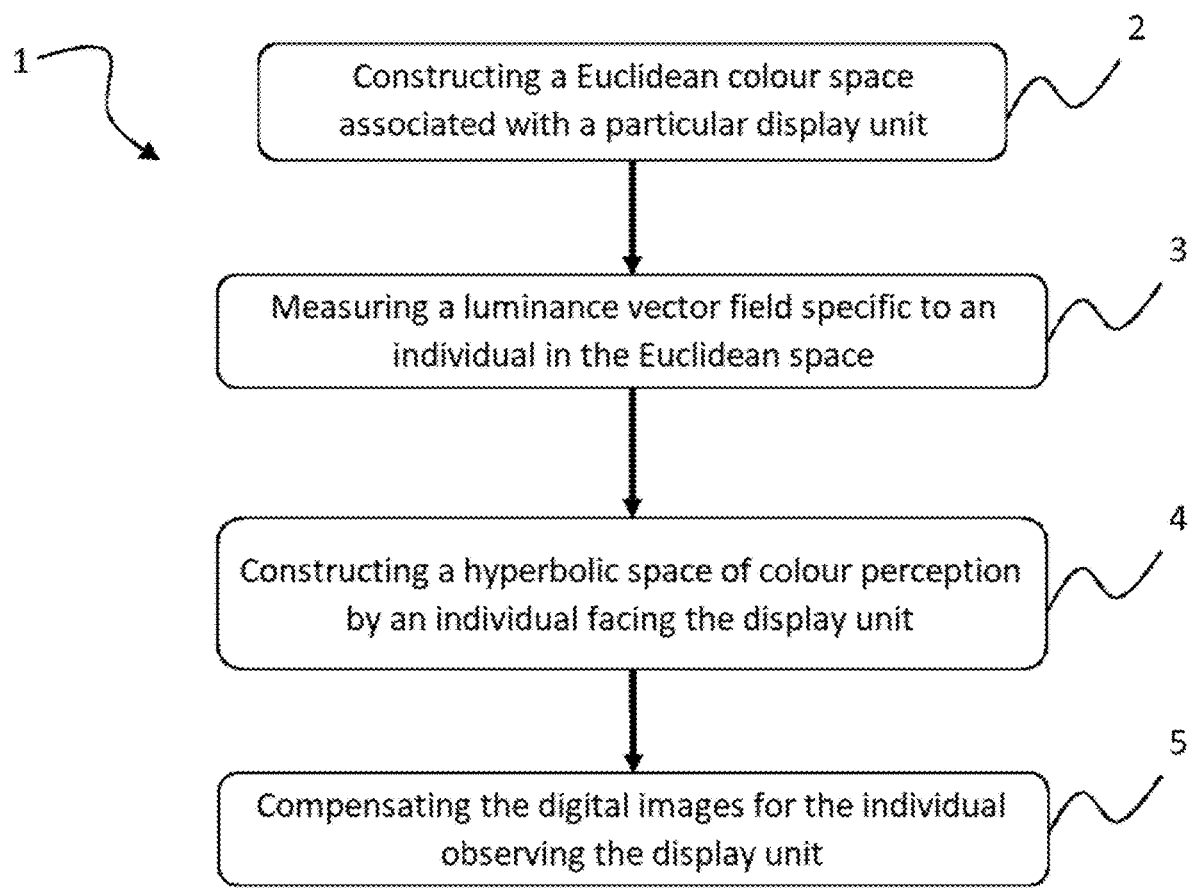
FIG. 1 represents several general steps of the method according to the invention.
Figure 2:
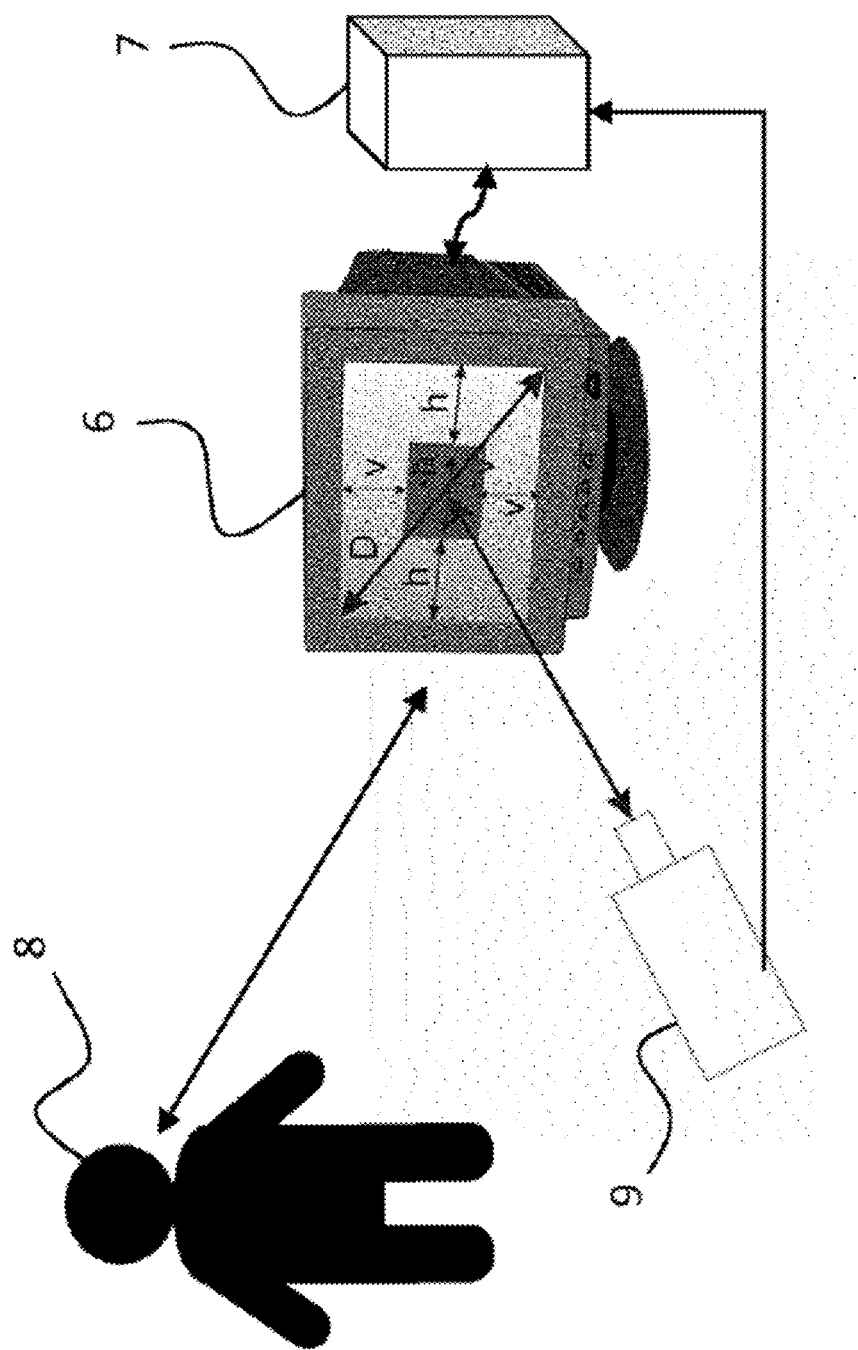
FIG. 2 represents a device for implementing the invention.

FIG. 2 represents an example of a device for implementing the method 1 according to the invention as shown in FIG. 1.

The first step 2 of construction of a Euclidean colour space associated with a display unit 6 can be implemented by a computer 7 comprising in particular at least one storage unit comprising program instructions capable of being executed on at least one processor of the computer 7. The program instructions implement the steps necessary for implementation of the method according to the invention. FIG. 2 represents technical characteristics of the display device 6 such as the size D of the diagonal of the screen thereof, as well as the dimensions h and v of the screen and of the projected image. The Euclidean colour space is constructed using luminance measurements carried out with a spectrophotometer 9.

The second step 3 of measuring the field of a luminance vector of a particular observer is implemented by the computer 6 having an interface, not shown, making it possible for the computer program to interact with the observer 8, in particular by receiving via this interface the reactions of the observer in the presence of a stimulus displayed on the screen, or display unit 6.

The third and fourth steps 4, 5 are also implemented by the computer 7.

The first step 2 of construction of a Euclidean colour space associated with the display unit is described below.

Generally, a display unit 6 produces lights which can be characterized by the spectral radiances thereof. By way of illustration, there may be mentioned the example of a display unit 6 having three degrees of colorimetric freedom: red, green and blue. A generalization to a display unit having more colour components is also possible by extension.

In order to measure the spectral radiance of the display unit 6, it is possible to use the spectrophotometer 9. The spectral radiance of the display unit 6 corresponds to a digital value called DV. The digital value is an instruction given to the display unit 6 by a video card of the computer 7 in order to display an image on each red, green or blue colour channel. The video card controls the display unit 6 by means of value instructions DV.

In the example shown in FIG. 2, the image to be measured extends over a third of the screen respectively in length h and height v. The background of the screen of the display unit 9 can be lit by a grey of mean luminance corresponding for example to a digital value of 0.74 for the red, green and blue channels.

For implementation of the first step 2 of construction of a Euclidean colour space associated with the display unit 6, digital values DVm are chosen that cover the whole of the possible spectral field with a regular pitch on each of the channels of the display unit. The radiance measurements are produced with these digital values DVm.

The set DVm can be described by a set $N_{DV}$ of digital values selected between zero and one. For example $N_{DV}=18$. Thus:

$$DVm = \left[0, \frac{1}{N_{DV}-1}, \frac{2}{N_{DV}-1}, \ldots, 1\right]^T \tag{1000}$$

Advantageously, $N_{DV}$ can adopt any value corresponding to the boundary of the colour resolution of the display unit. For example, for a system with 8 bits per colour channel, it is possible to choose up to 256 different values.

In another example, for a system with 15 bits per colour channel, it is possible to choose up to $2^{15}$ different values.

Radiance measurements for the set of DVm that control the red, green and blue channels of the screen are carried out using the spectrophotometer. Each red, green, blue channel is measured in isolation with respect to the other channels and also in combination with one or two others from the three channels in order to verify the additivity performance of the colours of the display unit 6.

If the matrix $DV_{all}$ of the set of vectors of the digital values applied on the different channels is chosen, having a size (7*18=126)×3, it can be expressed as follows:

$$DV_{all} = \begin{bmatrix} 1 & 0 & 0 \\ 0 & 1 & 0 \\ 0 & 0 & 1 \\ 1 & 1 & 0 \\ 1 & 0 & 1 \\ 0 & 1 & 1 \\ 1 & 1 & 1 \end{bmatrix} \otimes DVm \tag{1001}$$

It is assumed for example that the spectrophotometer provides nλ=401 spectral values for the radiance, covering the spectral field from 380 nm to 780 nm with a pitch of 1 nm. The matrix of size 401×126 containing the set of measured spectral radiances for all the digital values is called m(λ, $DV_{all}^T$).

Then, an affine model of the lights produced by the display unit 6 is constructed.

Figure 3:
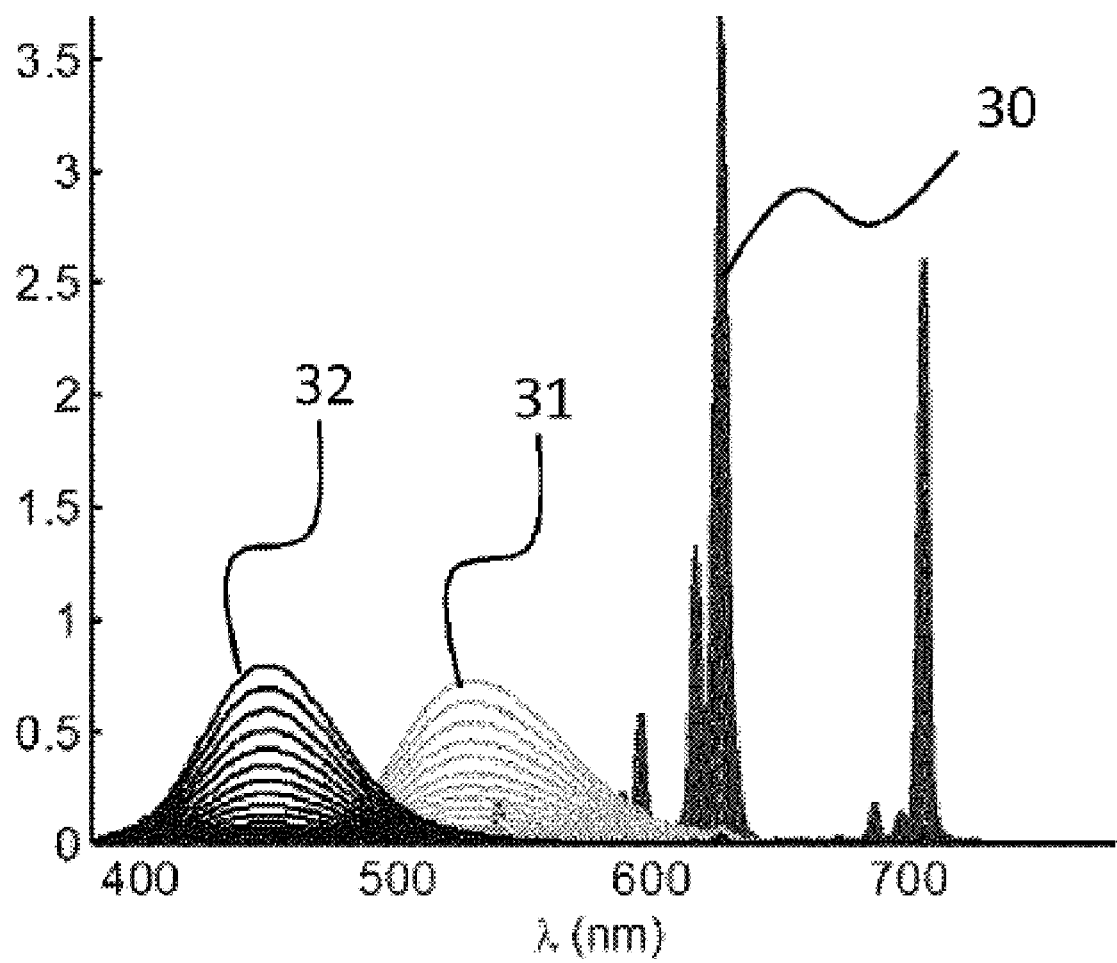
FIG. 3 represents a measurement of a radiance emitted by a display unit for the red, green and blue channels taken in isolation.

FIG. 3 represents an example of measuring radiance on the red 30, green 31 and blue 32 channels in isolation for eighteen values of DV between 0 and 1, for a display unit of the CRT, or cathode ray tube, type. Arbitrarily, the spectral radiance unit is 683.02 W/str/m²/nm. The constant 683.02 represents a maximum spectral luminance efficiency in lumen/W in the photopic field. The use of this particular constant value makes it possible to ensure that the scalar product of a spectral radiance $r(\lambda)$ by $V(\lambda)$, a function of spectral luminance efficiency, gives the luminance directly.

By thus normalizing the energies, the calculation of a luminance in cd/m² operates as a scalar product between the spectral radiance $r(\lambda)$ and the spectral luminous efficiency function $V(\lambda)$.

In FIG. 3, the x-axis represents the wavelength $\lambda$ in nanometres and the y-axis represents the multiple spectral radiance of 683.02 W/str/m²/nm.

Firstly, an affine model is constructed for predicting the radiance measurements $m(\lambda;DV^T)$ on the basis of the values of DV. Then, an orthogonal Euclidean space associated with the display unit is constructed as described below.

Figure 4:
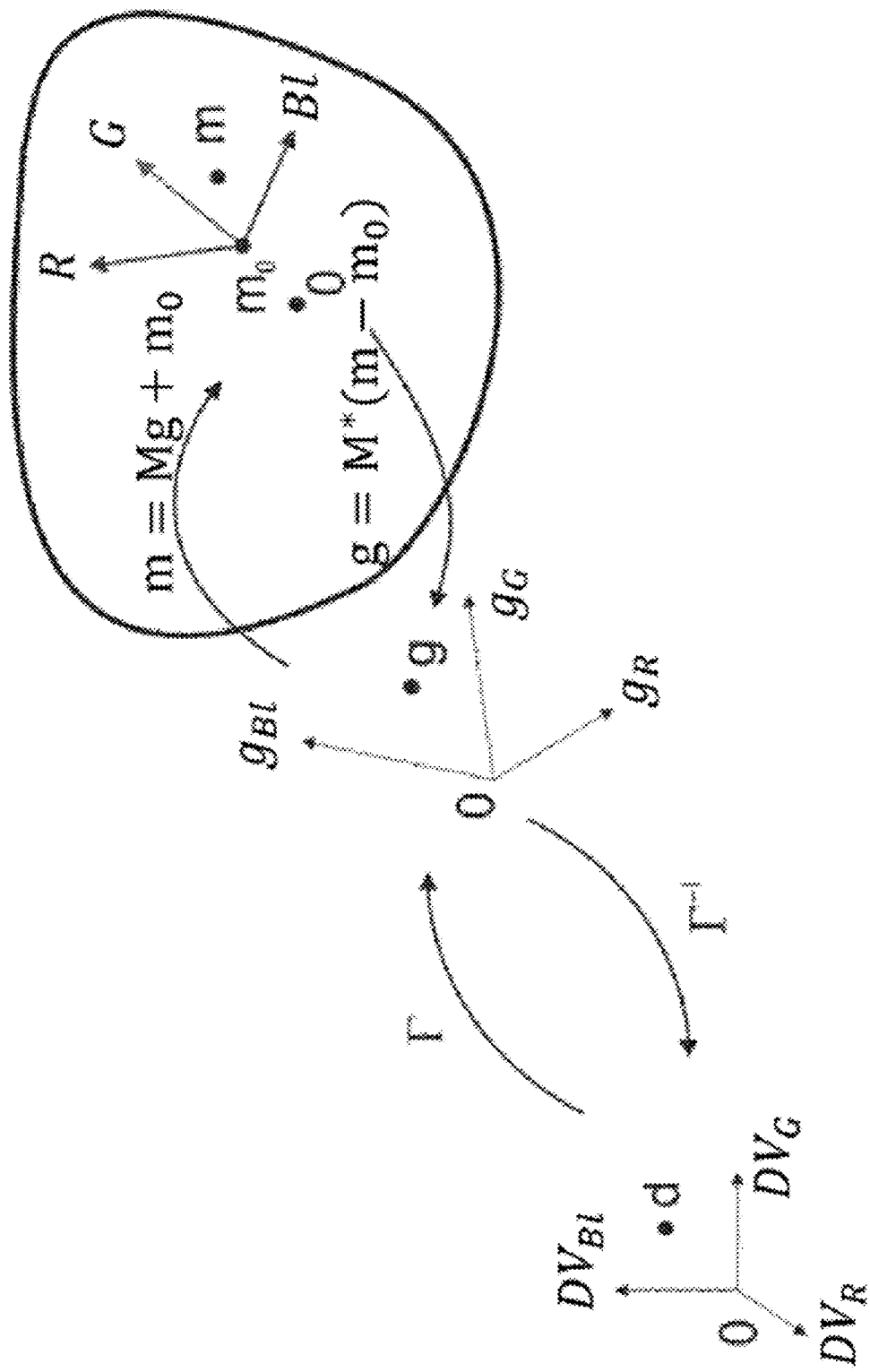
FIG. 4 represents a general principle diagram of an affine model of the light produced by a screen.

The general schema of the affine model of the light produced by a screen is shown in FIG. 4. FIG. 4 thus represents an affine model of light production m by a display unit as a function of the digital value d given to the video card. In FIG. 4 three spaces are represented: the space of the digital values DV represented by the reference (0, $DV_R$, $DV_G$, $DV_{Bl}$), the space of the gains of the display unit represented by the reference (0, $g_R$, $g_G$, $g_{Bl}$), and the space of the lights represented by the reference ($m_0$, R, G, Bl).

Based on a digital value vector $d=[d_R, d_G, d_{Bl}]^T$ given as an instruction to the video card, a gain vector $g=[g_R, g_G, g_{Bl}]^T$ is produced via a nonlinear vector function $\Gamma$. The gain vector expresses a gain comprised between 0 and 1 on the prototype functions of light emitted by the display unit via an affine model with matrix M and offset at the origin $m_0$.

As shown in FIG. 4, the affine model can be written:

$$m(\lambda,DV(i)^T)=Mg+m_0=M\Gamma(DV)+m_0 \quad (1003)$$

By assuming the additivity property of the display unit, it is possible to use only the measurements of the red, green and blue channels in isolation, in order to predict the set of measurements.

Hereinafter, the spectral radiance corresponding to a measured value is denoted $m(\lambda,DV(i)^T)$. The offset at the origin $m_0$ is estimated as the mean of the measured values for $DV(i)=[0, 0, 0]^T$. In fact, it is possible for example to measure the spectral radiance for this digital value seven times, i.e. once for each colour red, green, blue, yellow, magenta, cyan and grey. Thus:

$$m_0=\overline{m(\lambda,[0,0,0]^T)} \quad (1004)$$

Then, it is possible to calculate the prototype functions of the screen in two different ways.

A first way of choosing the prototype functions is to use the maxima of the measurements on the red, green, blue channels:

$$R(\lambda)=m(\lambda,[1,0,0]^T)-m_0$$

$$G(\lambda)=m(\lambda,[0,1,0]^T)-m_0$$

$$Bl(\lambda)=m(\lambda,[0,0,1]^T)-m_0 \quad (1005)$$

The gains are then given by:

$$g_R(i)=(R(\lambda)^TR(\lambda))^{-1}(m(\lambda,[DV(i),0,0]^T)m_0)$$

$$g_G(i)=(G(\lambda)^TG(\lambda))^{-1}(m(\lambda,[0,DV(i),0]^T)-m_0)$$

$$g_{Bl}(i)=(Bl(\lambda)^TBl(\lambda))^{-1}(m(\lambda,[0,0,DV(i)]^T)-m_0) \quad (1006)$$

A second way of choosing the prototype functions is to use a rank-one decomposition. For example the chosen channel is the red channel, but the method is equally applicable for the green and blue channels.

Thus a decomposition is carried out into singular values s and vectors u of the matrix of the measurements for the red channel:

$$m(\lambda,[DV(i),0,0])=usv^T \quad (1007)$$

$$R'(\lambda)=|u(:,1)|\sqrt{|s(1.1)|} \quad (1008)$$

$$g'_R(i)=\sqrt{|s(1.1)|}|v(:,1)| \quad (1009)$$

However, the rank-1 decomposition does not guarantee that the gains will be comprised between 0 and 1. The values are therefore corrected as follows:

$$R(\lambda)=R'(\lambda)g'_R(n_{DV}) \quad (1010)$$

$$g_R(i)=g_R'(i)/g_R'(n_{DV}) \quad (1011)$$

The matrix M is then composed of the following prototype functions:

$$M = \begin{bmatrix} R(\lambda_1) & G(\lambda_1) & Bl(\lambda_1) \\ \vdots & \vdots & \vdots \\ R(\lambda_{N_\lambda}) & G(\lambda_{N_\lambda}) & Bl(\lambda_{N_\lambda}) \end{bmatrix} \quad (1012)$$

The gain values are the exact values for the measured lights. However, in order to be capable of predicting the radiance for any values for digital value, it is advisable to interpolate the gains between the measured values. To this end, the following vector function is defined:

$$\Gamma:DV\to g, g=[g_R,g_G,g_{Bl}]^T=\Gamma(DV)=\Gamma([DV_R;DV_G;DV_{Bl}]^T) \quad (1013)$$

This function $\Gamma$ is a function defined in N parts as follows, for each of the colour channels c:

$$\Gamma^c(DV_c)=\{i=[1,\ldots,N];\Gamma_i(x)=a_i+b_ix^{y_i};x_{i-1}\le x\le x_i;x_0=0; x_N=1;a_1=0;b_N=1\} \quad (1014)$$

Then, two conditions are added to this function by parts: the first condition is that the contiguous parts recombine together, the second condition is that the right and left derivatives at the point of recombining are equal. These two conditions lead to the following equations:

$$\begin{cases} \Gamma_{i-1}(x_{i-1}) = \Gamma_i(x_{i-1}) \\ \frac{\partial \Gamma_{i-1}}{\partial x}(x_{i-1}) = \frac{\partial \Gamma_i}{\partial x}(x_{i-1}) \end{cases} \Rightarrow a_i, b_i \text{ constrained} \quad (1015)$$

The two conditions make it possible to determine the set of parameters $a_i$ and $b_i$. It then remains to determine the parameters $x_i$ and $y_i$ so that the function $\Gamma^c$ is fully determined. The parameters $x_i$ and $y_i$ respectively represent the x-axes and the radii of curvature of the recombining points between the parts of the function $\Gamma^c$.

The parameters $x_i$ and $y_i$ can be calculated by a non-linear least-squares optimization between the values DV and the measured gains.

The set of measured points for the channels RGBl (for Red, Green, Blue) for which there is the instruction value DV(i), and for which it is possible to calculate the gain g by $g_i = M^{-1}(m-m_0)$. Using the eighteen pairs (DV(i), $g_i$) a non-linear regression is used in order to find the best ($x_i$, $y_i$) values. The limit values are $a_0=0$ and $b_N=1$, $x_0=0$, $x_N=1$. The position of the parts, as well as the exponential gamma curve, which governs the curvature of the part, are calculated by nonlinear regression.

Furthermore, the set of these parameters is to be determined for each of the red, green and blue channels.

The inverse function of $\Gamma_i$ is also fully defined by these parameters $x_i$ and $y_i$:

$$x = \Gamma_i^{-1}(y) = \left(\frac{y-a_i}{b_i}\right)^{1/\gamma i}; \quad (1016)$$

$$y_{i-1} = \Gamma_{i-1}(x_{i-1}) \leq y \leq y_i = \Gamma_i(x_i)$$

The inverse affine transformation M* is given by $$M^* = (M^T M)^{-1} M^T \quad (1017)$$

according to the models proposed by J. Cohen & Kappauf, in W. E. (1985). Color mixture and fundamental metamers: Theory, algebra, geometry, application. *The American journal of psychology*, 171-259, and $$g = M^*(m-m_0) \quad (1018)$$

Figure 5:
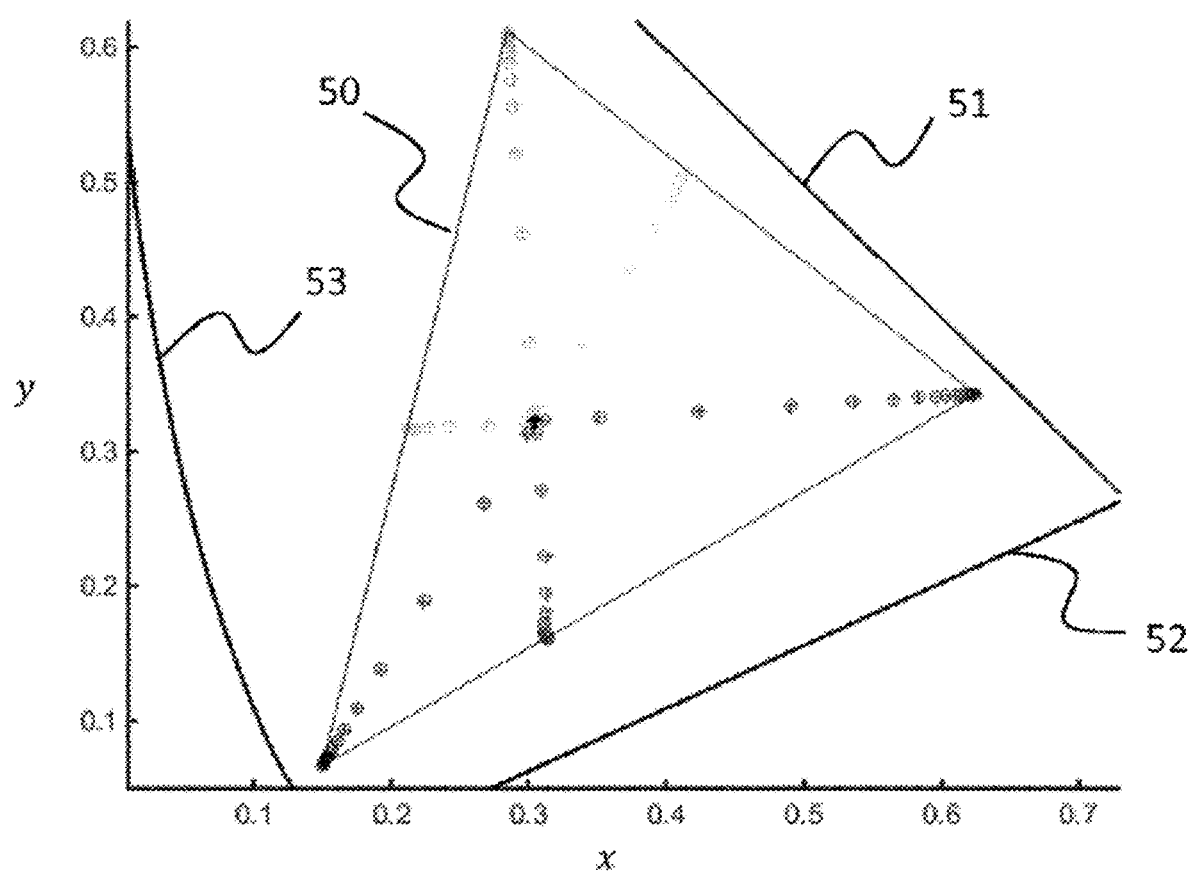
FIG. 5 represents an application of the affine model of the light produced by the screen in the space CIE-xy.

FIG. 5 represents an application of the affine model in a (truncated) chromatic diagram according to the CIE-xy colorimetric system. The x-axes and y-axes respectively are the values of x and y in the chromatic diagram. Conventionally, the straight line 52 is the line of the purple colours and the curves 51 and 53 are the limits of the spectrum locus defining the limits of human colour vision capability. A triangle 50 represents a gamut of the display unit, i.e. a set of colours that can be displayed by said display unit. The triangle can be transformed into a square or pentagon if four or more primary colours are used to generate the lights. The crosses represent each coordinate in the CIE-xy space of the measured radiances. The circles represent the xy coordinates of the spectral radiances simulated via the affine model of the equation (1003) based on the vectors of DV corresponding to the measurement points. FIG. 5 demonstrates the precision of the affine model used: in fact a good correspondence is noted between the circles and the crosses. This precision is advantageously due to the quality of the approximation of the r function which is here defined in five parts.

Then, an orthogonal Euclidean space is constructed as follows:

The affine model of production of the light by a display unit is not associated with a metric space. If the natural scalar product is defined in the Hilbert spaces H, representing the space of the lights, said natural scalar product is defined by:

$$<f_1(\lambda)|f_2(\lambda)> = \int_{380}^{780} f_1(\lambda) f_2(\lambda) d\lambda = f_1^T f_2 \quad (1019)$$

where $f_1(\lambda)$ and $f_2(\lambda)$ are two spectral radiances and $f_1$ and $f_2$ are the vectors corresponding to the sampled values; if this scalar product is applied to the calculation of an autocorrelation matrix $C_a$ of the vector space of the screen, the following is obtained:

$$C_a = M^T M = \begin{bmatrix} 81 & 3.7 & 0.99 \\ 3.7 & 29 & 4.3 \\ 0.99 & 4.3 & 29 \end{bmatrix} \neq \begin{bmatrix} 1 & 0 & 0 \\ 0 & 1 & 0 \\ 0 & 0 & 1 \end{bmatrix} \quad (1020)$$

This autocorrelation matrix $C_a$ is manifestly different from unity. This difference is due to the correlation between the red, green and blue channels as well as to the norm of the vectors of these channels which is different from one.

In order to render orthogonal the affine space of the display unit, it is possible to use in particular one of the four following methods:

a first method called by decorrelation;
a second method by canonical spectral projection;
a third method by the Gram-Schmidt method;
a fourth method by decomposition into singular values of the linear application.

Of course, other methods can be used.

The first method for rendering orthogonal the affine space of the main display unit is for example the method by decorrelation.

A way of rendering unitary the correlation matrix is to carry out the following change of variable:

$$T^{-1} = C_a^{-\frac{1}{2}}; \quad N = MT^{-1} \quad (1021)$$

It is then easy to verify that $N^T N = \text{Id}$ and that N is a matrix containing the orthonormal vectors. The orthonormal matrix N defines an orthogonal space associated with the display unit 6: this is a Euclidean space corresponding to the display unit 6 in which the norm and the orthogonality are clearly defined. The three vectors that compose the matrix N and which form the base vectors of the orthonormal space are denoted ABC. Since the matrix N is orthonormal, the inverse transformation is given by $N^{-1} = N^T$.

Figure 6:
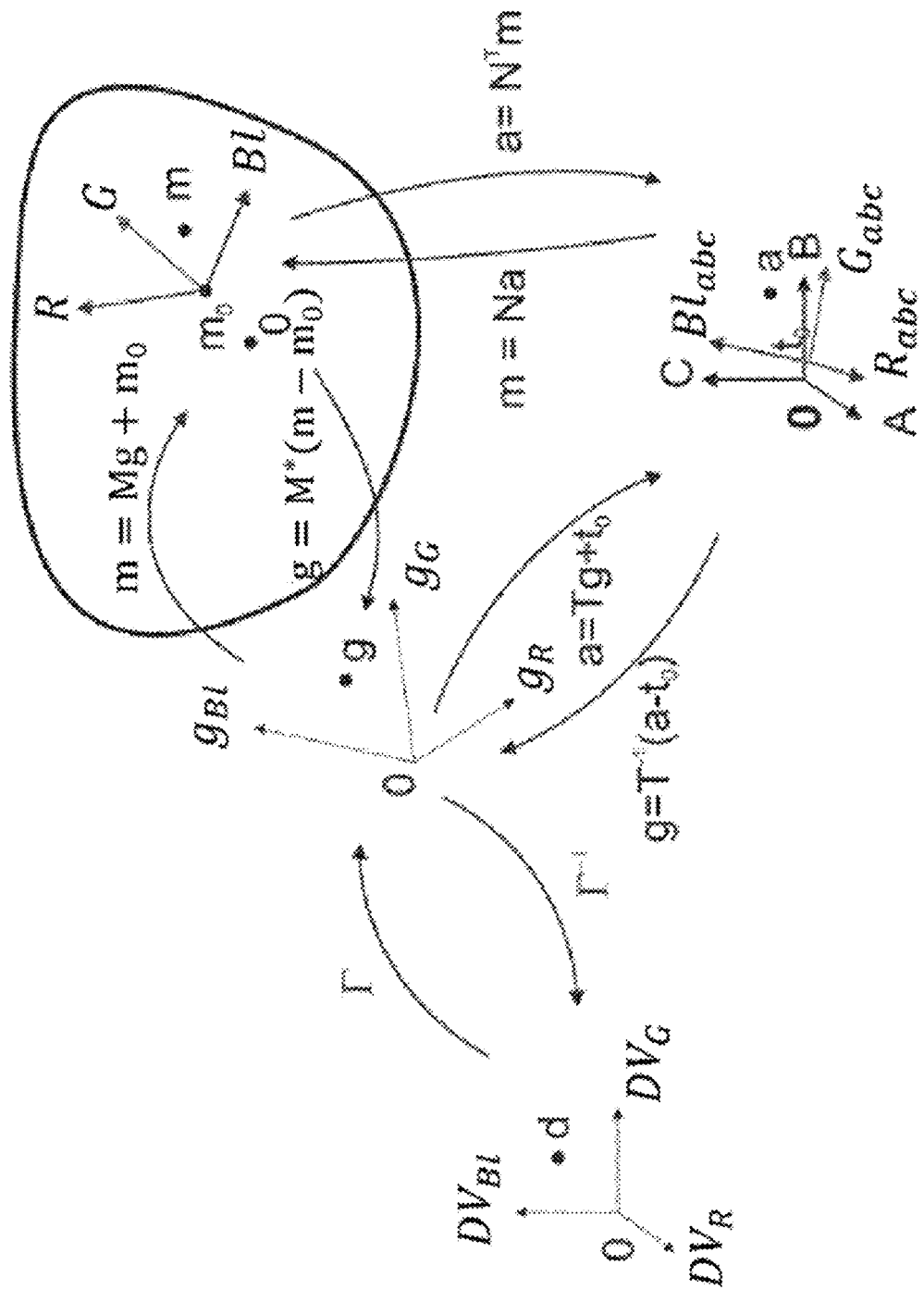
FIG. 6 represents the relationships between an orthogonal space ABC, the affine space of the lights and the space of the screen gains.

FIG. 6 represents the relationships between the orthogonal space ABC, the affine space of the lights RGBl and the space of the gains ($g_R$, $g_G$, $g_{Bl}$) of the display unit 6: based on the affine model RGBl of the light produced by the display unit 6, an orthonormal space ABC associated with the display unit 6 is constructed. The transformation N that allows passing from the space of the lights RGBl to the orthonormal space ABC and T the transformation that allows passing from the orthonormal space ABC to the space of the gains ($g_R$, $g_G$, $g_{Bl}$) of the display unit 6 are defined.

The vector $t_0 = N^T m_0$ is then defined, which is the correspondent in the space ABC of the offset $m_0$ in the affine space RGBl. The transformation between the space ABC and the space of the gains is then defined for the variable a of the space ABC and the variable g in the space of the gains by:

$$g = T^{-1}(a - t_0); \quad T = (T^{-1})^{-1} = C_a^{\frac{1}{2}}; \quad a = Tg + t_0 \quad (1022)$$

The benefit of the latter transformation is to be able to define a stimulus in ABC directly and to be able to generate it on the screen by transforming it in the space of the gains with the equations (1022) and then in the space of the digital values with the function $\Gamma^{-1}$ defined by the equations (1016).

The second method for rendering orthogonal the affine space of the main display unit is the method by canonical projection. This projection uses a projector called a Cohen projector; it is also named spectral projector decomposition method.

This other way of defining the orthonormal space associated with the display unit consists of using the spectral projection matrix R defined by J. Cohen & Kappauf in the article cited above. This spectral projection matrix R makes it possible to define a projection operator which links the space of the lights with the space of the gains directly in the Hilbert space of the lights, provided with the scalar product thereof according to the equation (1019). This projection matrix makes it possible to define the orthogonal projection that projects any light, defined by the spectral radiance thereof, in the vector subspace of the lights that can be displayed by the screen. This projection is defined by the following matrix R:

$$R = M(M^T M)^{-1} M^T \quad (1023)$$

It is possible to verify easily that this spectral operator R is a projector, because it is idempotent: $RR=R^2=R$. However, the projector R is not in its canonical form. In order to render it canonical the projector R is decomposed using the following singular value decomposition:

$$R = usv^T \quad (1024)$$

It is possible to verify that this decomposition produces a diagonal matrix s of singular values that contains only three values that are non-zero and equal to one. R can thus be rewritten as follows:

$$R = \begin{bmatrix} u_1 & u_2 \end{bmatrix} \begin{bmatrix} s_1 & 0 \\ 0 & 0 \end{bmatrix} \begin{bmatrix} v_1^T \\ v_2^T \end{bmatrix} = u_1 v_1^T = NN^T \quad (1025)$$

The matrix N of projection of the lights in the orthogonal space ABC is thus here directly calculated based on the singular vectors of the projection matrix. The conversion of the orthogonal space ABC to the gain space is thus given by:

$$T = N^T M, T^{-1} = (T)^{-1}, t_0 = N^T m_0 \quad (1026)$$

The third method for rendering orthogonal the affine space of the main display unit is the Gram-Schmidt method.

Historically, orthogonal spaces are constructed based on spaces the basis of which is not orthogonal, by virtue of the method called Gram-Schmidt method. The advantage of this method is that it is possible to retain the direction of one of the components of the space, normalize it, and then modify the other components so that they are unitary and orthogonal to the first. For example, it is possible to choose the green component as a first vector and transform the red and blue components in order to guarantee orthogonality with the first vector.

Let R, G and Bl be the vectors of the components of M: M=[R G Bl].

Then the orthogonal projection operator on a vector straight line with direction vector u can be defined according to the Gram-Schmidt method by:

$$proj_u(v) = \frac{\langle u, v \rangle}{\langle u, u \rangle} u \quad (1027)$$

The transformation of the affine space of the lights RGBl to the orthonormal space ABC is then given by the following relationships if B becomes normalized G:

$$G' = G \quad (1028)$$
$$B = \frac{G'}{\|G'\|}$$
$$R' = R - proj_{G'}(R)$$
$$A = \frac{R'}{\|R'\|}$$
$$Bl' = Bl - proj_{G'}(Bl) - proj_{R'}(Bl)$$
$$C = \frac{Bl'}{\|Bl'\|}$$

Then the matrix N=[A B C] is constructed and the transformation T of the orthonormal space ABC to the gain space as in the equation (1026) is deduced therefrom.

The fourth method for rendering orthogonal the affine space of the main display unit is the method by decomposition into singular values of the linear application.

The matrix M can be regarded as a linear application between the space of the lights RGBl and the space of the gains. It is possible to determine directly an orthogonal unitary application based on M using a decomposition into singular values. As the matrix is rank three, there are only three singular values therein and it is possible to simplify the decomposition:

$$M = usv^T = \begin{bmatrix} u_1 & u_2 \end{bmatrix} \begin{bmatrix} s_1 & 0 \\ 0 & 0 \end{bmatrix} \begin{bmatrix} v_1^T \\ v_2^T \end{bmatrix} \quad (1029)$$

The matrix N is then given directly by $N=u_1$. The transformation between the orthonormal space ABC and the space of the gains is then also given by the equation (1026).

FIGS. 7a, 7b, 7c, 7d represent the components A, B, C obtained based on each of the methods for rendering orthogonal the affine space of the main display unit described above. FIGS. 7a, 7b, 7c, 7d represent spectral radiances as multiples of 683.02 W/str/m²/nm, as a function of the wavelengths λ in nm.

Figure 7B:
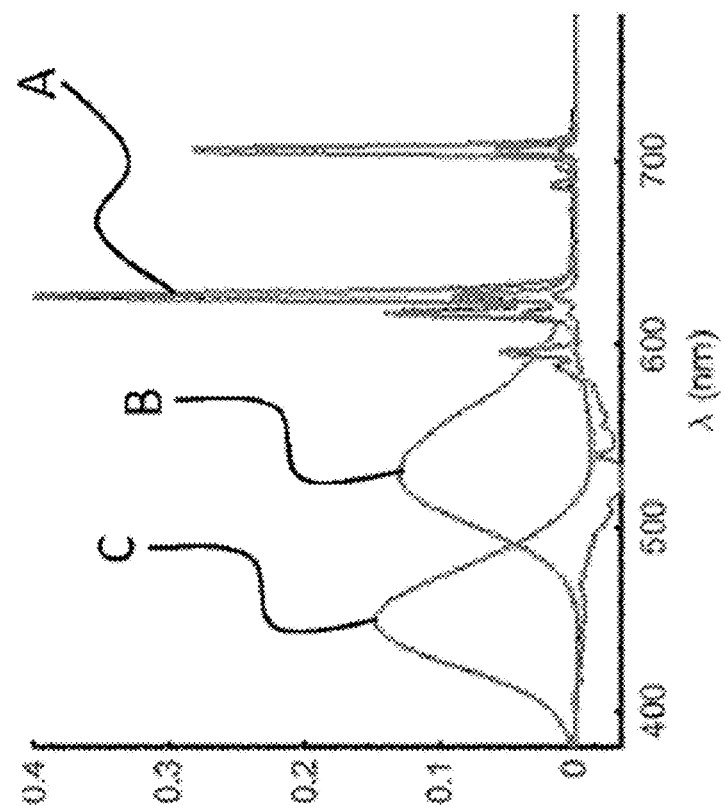
FIG. 7b represents components ABC obtained by canonical projection.
Figure 7A:
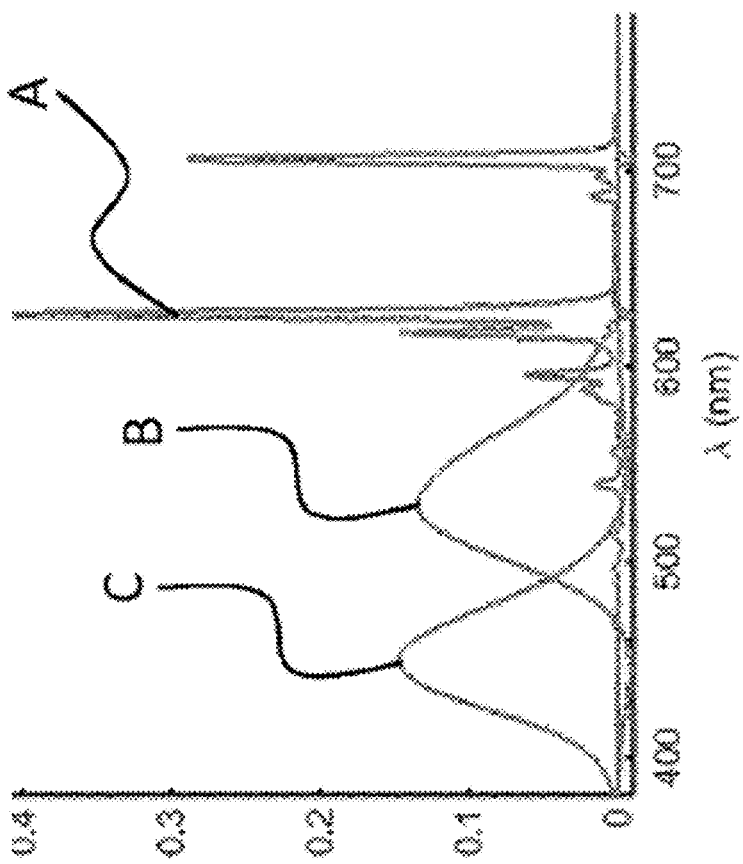
FIG. 7a represents components ABC obtained by a first decorrelation method.

FIG. 7a represents components ABC obtained by the first decorrelation method.

FIG. 7b represents the components ABC obtained by canonical projection or Cohen projector.

Figure 7D:
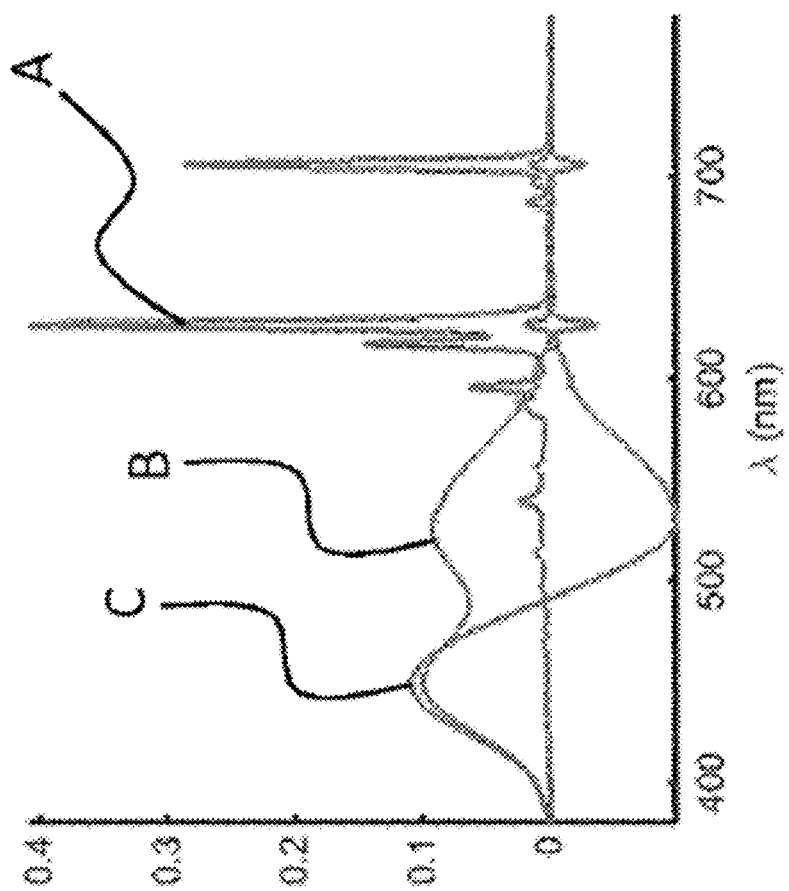
FIG. 7d represents components ABC obtained by a method of decomposition into singular values of the linear application.
Figure 7C:
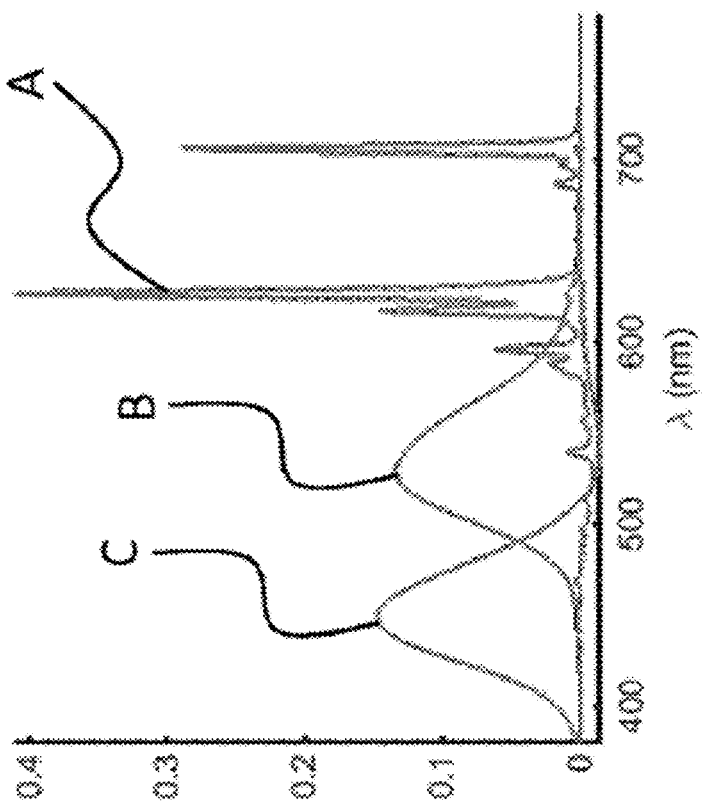
FIG. 7c represents components ABC obtained by the Gram-Schmidt method.

FIG. 7c represents the components ABC obtained by the second Gram-Schmidt method.

FIG. 7d represents the components ABC obtained by the method by decomposition into singular values of the linear application.

The methods presented do not form an exhaustive description of all the possible methods for converting a space supported by a free family, in orthonormal space. As other methods there may be mentioned, for example, the separation of sources methods.

All these methods are equivalent plus or minus one rotation. In fact, it is verifiable that each of the functions ABC can be obtained based on the decomposition given by decorrelation, by applying a three-dimensional rotation.

It is possible to represent the associated three-dimensional space ABC, and to represent the vectors R, G, Bl contained in the matrix M and offset by $m_0$, that define the space that can be displayed by the display unit, as shown in FIGS. 8a, 8b, 8c, 8d. The coordinates of the components R, G, Bl in the space RGBl are given by the three column vectors that compose the matrix T. FIGS. 8a, 8b, 8c, 8d present the vectors R, G, Bl on a three-dimensional representation in space A B C generated according to each of the methods for rendering orthogonal the affine space of the display unit.

Figure 8B:
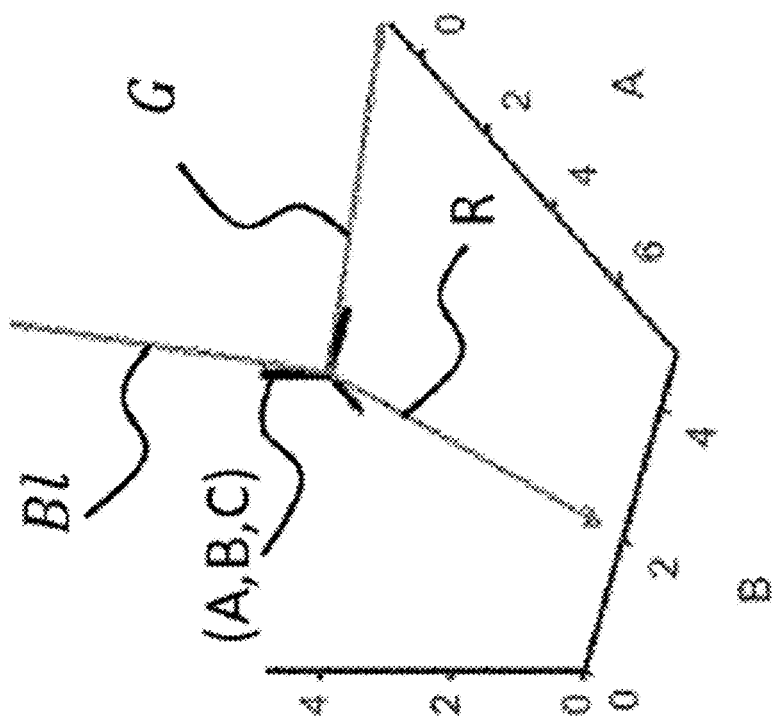
FIG. 8b represents, in the space of ABC, the components RGBl according to the canonical projection method.
Figure 8A:
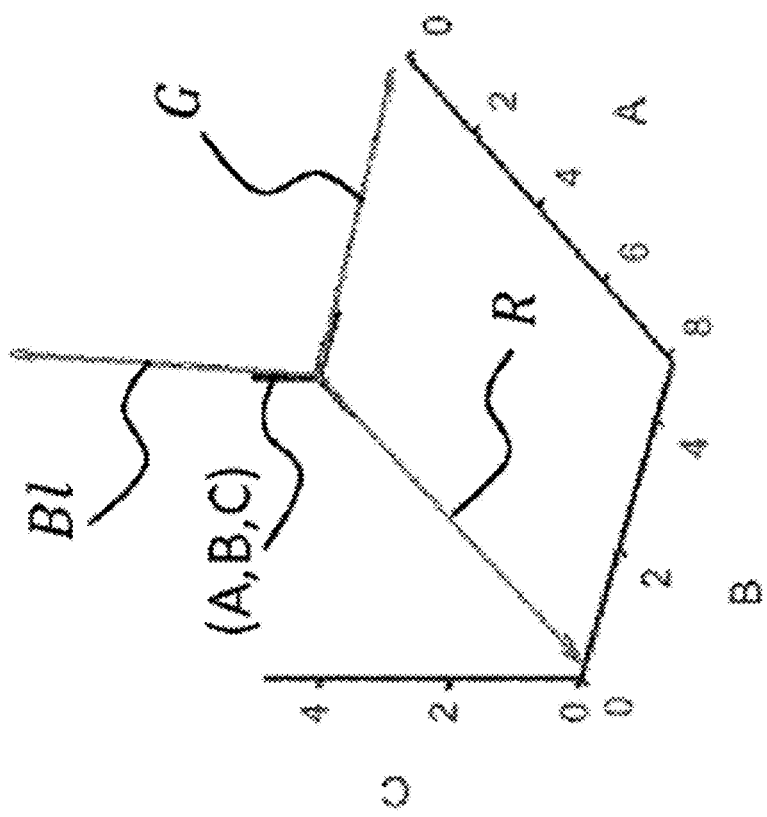
FIG. 8a represents, in the space of ABC, the components RGBl according to the decorrelation method.

FIG. 8a represents, in the space ABC, the components R, G, Bl according to the decorrelation method.

FIG. 8b represents, in the space ABC, the components R, G, Bl according to the canonical projection or Cohen projector method.

Figure 8D:
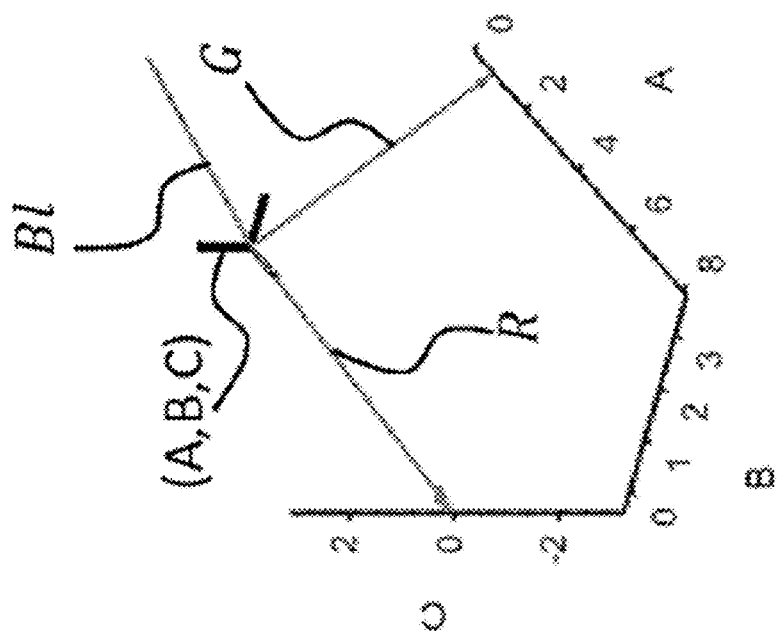
FIG. 8d represents, in the space of ABC, the components RGBl according to the method of decomposition into singular values of the linear application.
Figure 8C:
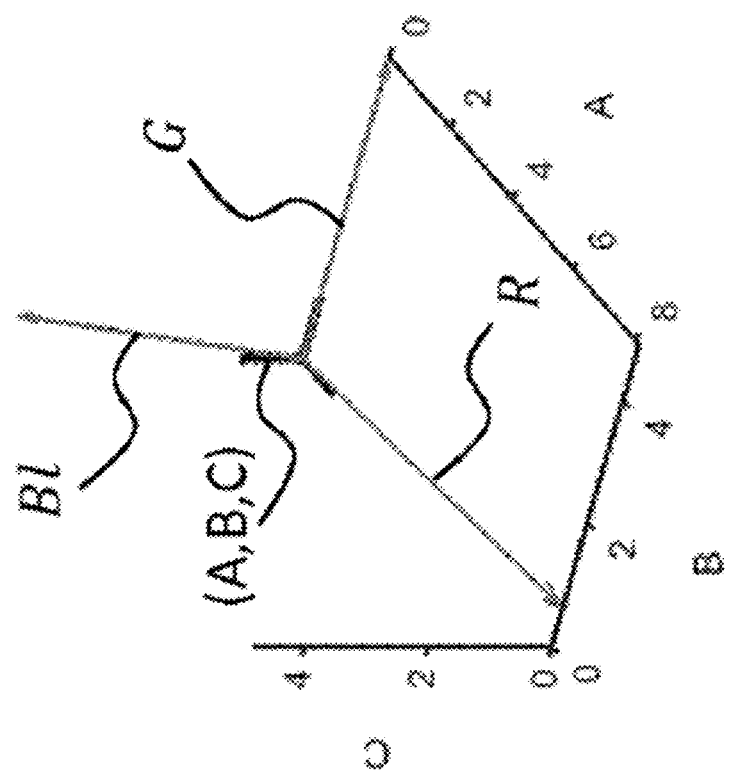
FIG. 8c represents, in the space of ABC, the components RGBl according to the Gram-Schmidt method.

FIG. 8c represents, in the space ABC, the components R, G, Bl according to the Gram-Schmidt method. This method advantageously makes it possible to avoid errors on the transformations and avoids confusing them with the transposes thereof.

FIG. 8d represents, in the space ABC, the components R, G, Bl according to the method of decomposition into singular values of the linear application.

The Gram-Schmidt method can for example be used within the framework of the invention. Advantageously, the Gram-Schmidt method makes it possible to verify the validity of the transformations and avoids errors in the transposed transformations. In fact, if the transformation is carried out correctly, then the vector G is colinear with the axis B of the coordinate system ABC.

The second step 3 is the step of measuring the field of a luminance vector viewed by a particular observer in the Euclidean space defined above.

In order to measure the direction of luminance relative to an observer, the orthonormal space ABC generated during the preceding first step 2 is used.

About a point in the colour space ABC, the luminance is defined as the direction originating from this point for which the luminous intensity changes without changing the hue or the saturation of the colour of the point viewed by the observer.

Figure 9B:
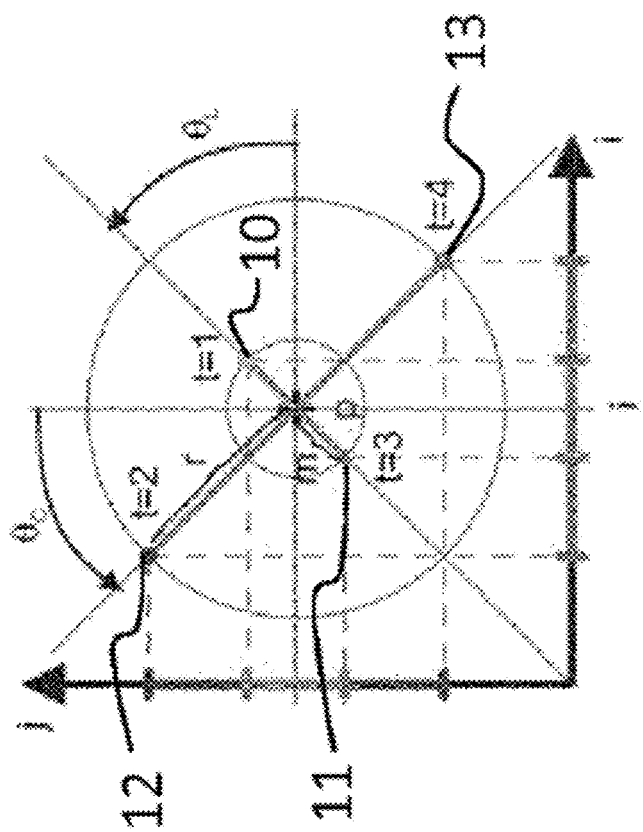
FIG. 9b represents the equation of the "minimum motion" stimulus.
Figure 10:
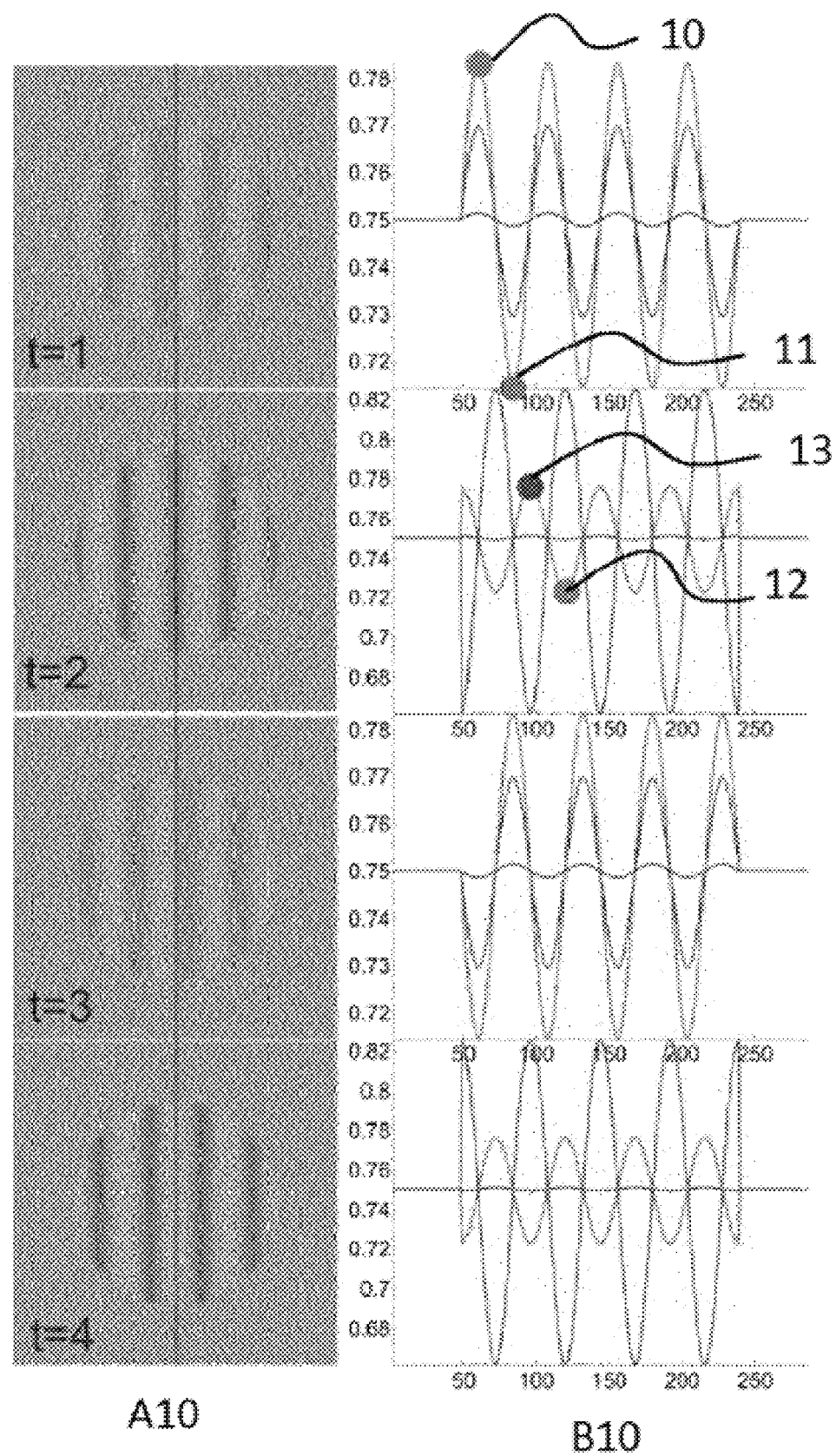
FIG. 10 represents a spatial construction of the "minimum motion" stimulus.

For this second step 3, the experiment called "minimum motion photometry" is implemented in order to measure the direction of luminance relative to the observer about a point. The principle of the experiment of "minimum motion photometry" is partially described by Anstis, S. M., & Cavanagh in "*A minimum motion technique for judging equiluminance. Colour vision: Physiology and psychophysics, 155-166*" with a representation space of the undefined stimulus. The "minimum motion photometry" experiment according to the invention consists of presenting the observer with a stimulus as shown in FIGS. 9b and 10 in an orthogonal Euclidean colour space ABC. The "minimum motion photometry" stimulus makes it possible to compare a relative luminance between two points in colours. If one of the points is brighter than another, a movement of the stimulus will be observed by the individual or observer. If the luminance ratio is inverted, then the direction of movement perceived will also be inverted. It is then possible to find which test points have the same luminance as a given reference point. The set of these points forms an equiluminant surface about the reference point. The equiluminant surface can be considered a plane, if the test points are close to the reference point. The direction of luminance is therefore a vector orthogonal to this equiluminant plane originating from the reference point.

If a point p is considered in the space ABC and the luminance vector $V(\lambda)$ defined according to the CIE 2006 standard in the space ABC, then the coordinates of the luminance vector $V(\lambda)$ are given by:

$$V_{abc} = N^T V(\lambda) \tag{1039}$$

Let v be the vector normalized at one of $V_{abc}$ then $v = V_{abc}/\|V_{abc}\|$. Then, a plane P1 is constructed passing through the point p, one of the direction vectors of which is v. This plane is used in order to define the "minimum motion" stimulus. To this end, a coordinate system (p, i, j) is also defined in the plane P1.

Let P1 be the plane which passes through the point p, of direction vectors v and [1 0 0] in the space ABC. The vector n normal to the plane P1 is defined by:

$$n = v \wedge [1\ 0\ 0]^T; n = n/\|n\| \tag{1040}$$

It is then possible to define two unitary vectors i and j that are orthogonal and the sum of which is equal to v. These vectors are obtained by rotating the vector v about the axis borne by the vector n normal to the plane P1 through an angle of plus or minus $\pi/4$. A rotation of angle $\alpha$ about the vector n is given by:

$$Rot_n(\alpha) = \begin{bmatrix} (1-c)n_1^2 + c & (1-c)n_1n_2 - n_3 s & (1-c)n_1n_3 + n_2 s \\ (1-c)n_1n_2 + n_3 s & (1-c)n_2^2 & (1-c)n_2n_3 - n_1 s \\ (1-c)n_1n_3 - n_2 s & (1-c)n_3n_2 + n_1 s & (1-c)n_3^2 \end{bmatrix} \tag{1041}$$

with: $c = \cos(\alpha)$; $s = \sin(\alpha)$; $n = [n_1\ n_2\ n_3]^T$. Thus:

$$i = Rot_n(-\pi/4)v \text{ and } j = Rot_n(\pi/4)v \tag{1042}$$

is obtained.

Figure 9A:
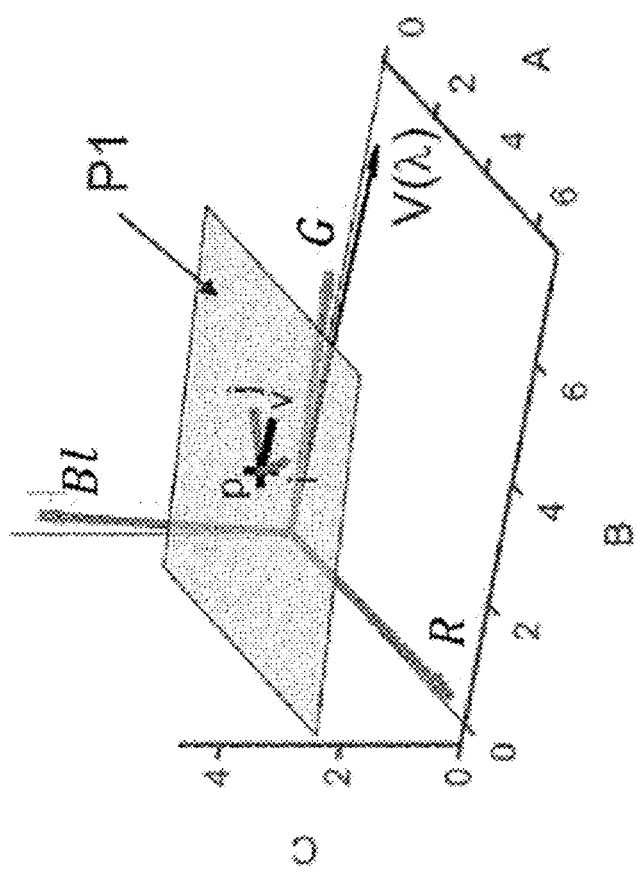
FIG. 9a represents within the coordinate system ABC, the plane P1 in which a "minimum motion" stimulus is constructed.

FIG. 9a represents in the coordinate system ABC, the plane P1 of direction vectors v and [1 0 0], the coordinate system (p, i, j) such that i+j=v, as well as the components, R, G, Bl and the luminance vector V(A).

In the plane P1 provided with the coordinate system (p, i, j), the "minimum motion" stimulus is defined by:

$$s(x,t) = j(m \sin \theta_L \sin 2\pi f_x x \sin 2\pi f_t t - dr \cos \theta_c \cos 2\pi f_x x \cos 2\pi f_t t) + i(m \cos \theta_L \sin 2\pi f_x x \sin 2\pi f_t t + dr \sin \theta_c \cos 2\pi f_x x \cos 2\pi f_t t) \tag{1043}$$

The parameters of the stimulus are represented in FIG. 9b in the coordinate system (p, i, j). A stimulus is a succession of colour frames displayed on a screen. For the example shown in FIG. 9b, a stimulus with four frames is used. The lengths m and r represent contrasts of the frames t=1 with t=3 and t=2 with t=4. $\theta_L = \theta_C = \pi/4$ is set so that the colours in the frames are orthogonal. It is also possible to modify these angles in order to measure the "minimum motion" instead of rotating the coordinate system (p, i, j). However, the latter method gives less satisfactory results.

x=1 . . . X and t=1 . . . T define a spatial and temporal extent of the frames, with X a total number of spatial points of the stimulus and T a total number of frames. $f_x = 1/(Xn_{bars})$ defines a spatial frequency of the stimulus and $f_t = 1/T$ a temporal frequency of the stimulus. It is possible to use for example $n_{bars} = 4$ and T=4, which means that the stimulus has four spatial periods and four temporal periods. It is also possible to study the modification of the vector field with the spatial or temporal frequency.

The parameter d={−1.1} makes it possible to invert the perceived direction of movement, all the other values of the parameters of the equation (1043) being otherwise equal. In fact, this parameter can be regarded as an inversion of the frames t=1 and t=3 in the frame sequence. The parameter d is used in order to prevent the observer being able to use the appearance of the colours in the frames for deducing the movement thereof. This parameter d is chosen at random during presentations of the stimulus to the observer in order to change at random the direction of movement perceived.

The parameter d thus chosen therefore prevents the observer from using the appearance of the image to determine the movement perceived.

For example, the parameter d advantageously makes it possible to avoid a greenish stimulus always leading to a perception of leftward movement, while a reddish stimulus always leads to a perception of rightward movement.

The stimulus is spatially constructed as shown in FIG. 10. The principle of the stimulus is to dephase the frames so that the frames t=1 and t=3 as well as t=2 and t=4 are respectively in phase opposition. The successive frames (t=1; t=2), (t=2; t=3), (t=3; t=4) and (t=4; t=1) are for their part offset by a quarter of a cycle.

The diagrams of the right-hand column B10 in FIG. 10 represent the spatial profile of the digital values DV: red, DV/R; green, DV/G and blue, DV/Bl for the different frames. For the frames t=1 and t=3, the colours RGBl are in phase while for the frames t=2 and t=4 they are in phase opposition. The light yellow 10, dark yellow 11, red 12 and green 13 points represent the digital values DV of the points corresponding to the space ABC in FIG. 9a.

The images on the left in column A10 in FIG. 10 represent the images displayed for each frame.

The stimulus is composed of a temporal sequence of four frames with sinusoidal spatial modulations such as shown in FIG. 10. This sequence produces a rightward, respectively leftward, movement, if the point for t=2 appears brighter, or respectively less bright, for the observer than the point for t=4. The points at t=1 and t=3 are frames that induce the movement, they are composed of the vector sum of i and j, added or subtracted at point p.

For d=1 the measurement principle is that if the bright sensation of the green for an observer is greater than the bright sensation of the red, a leftward movement is apparent to the user, because the green of the frame t=2 will follow the brighter yellow of the frame t=3 and follow the green of the frame t=4, etc. Thus the observer has a sensation of leftward movement. If the red is brighter for the observer than the green, then rightward movement is perceived. For d=1 the movements are reversed.

The minimum movement is determined by rotating the coordinate system from an initial position (p, $i_{ini}$, $j_{ini}$) to a position (p, $i_{obs}$, $j_{obs}$) for which the movement of the stimulus is minimal for the observer. The angle of rotation of the coordinate system is given by $\theta_{obs}$ as shown in FIG. 11a.

Figure 11A:
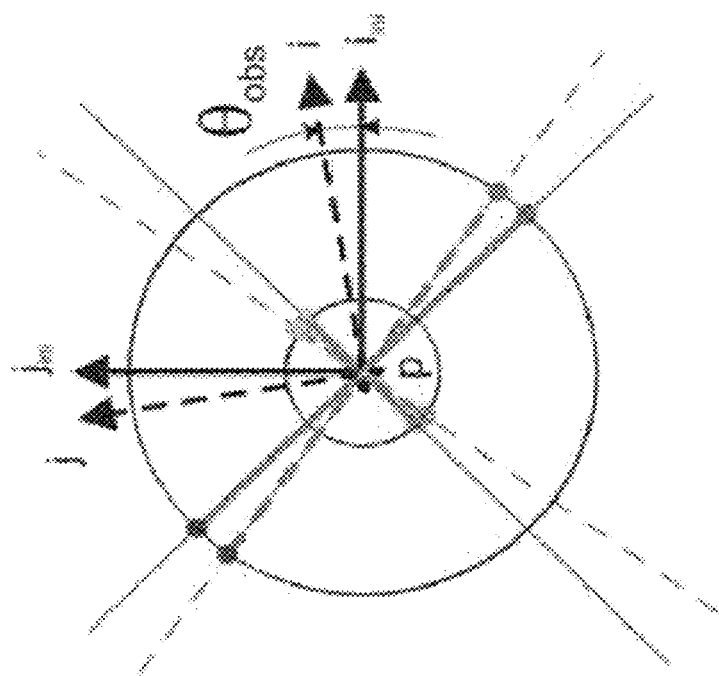
FIG. 11a represents a rotation of a coordinate system (p, i, j) of the plane P1.
Figure 12B:
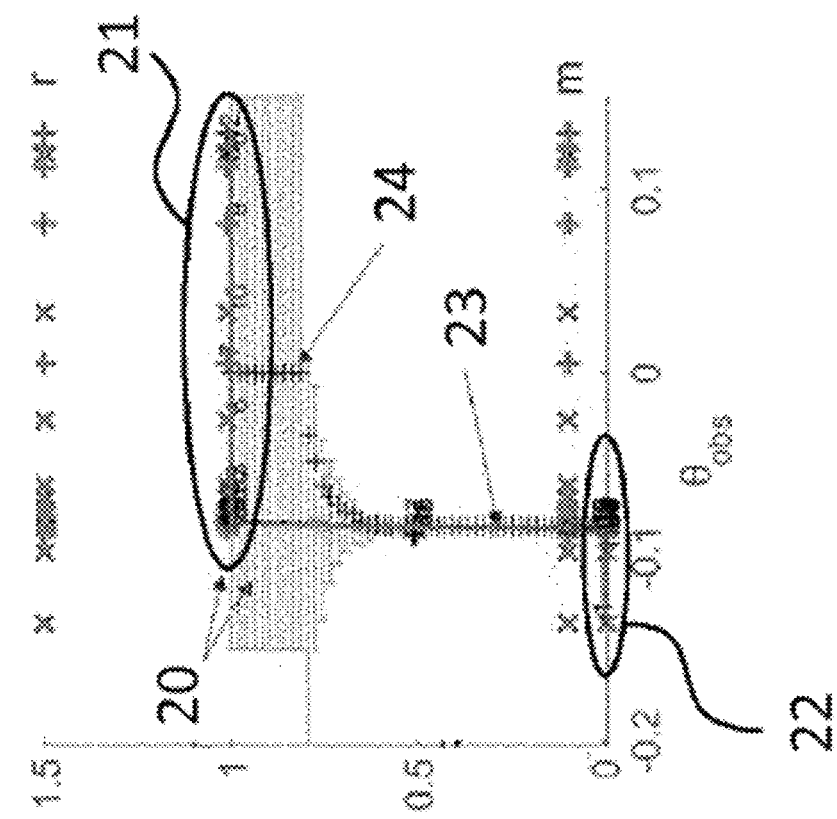
FIG. 12b represents a procedure of estimation of a threshold of perception of a minimal movement as a function of the rotation.
Figure 12A:
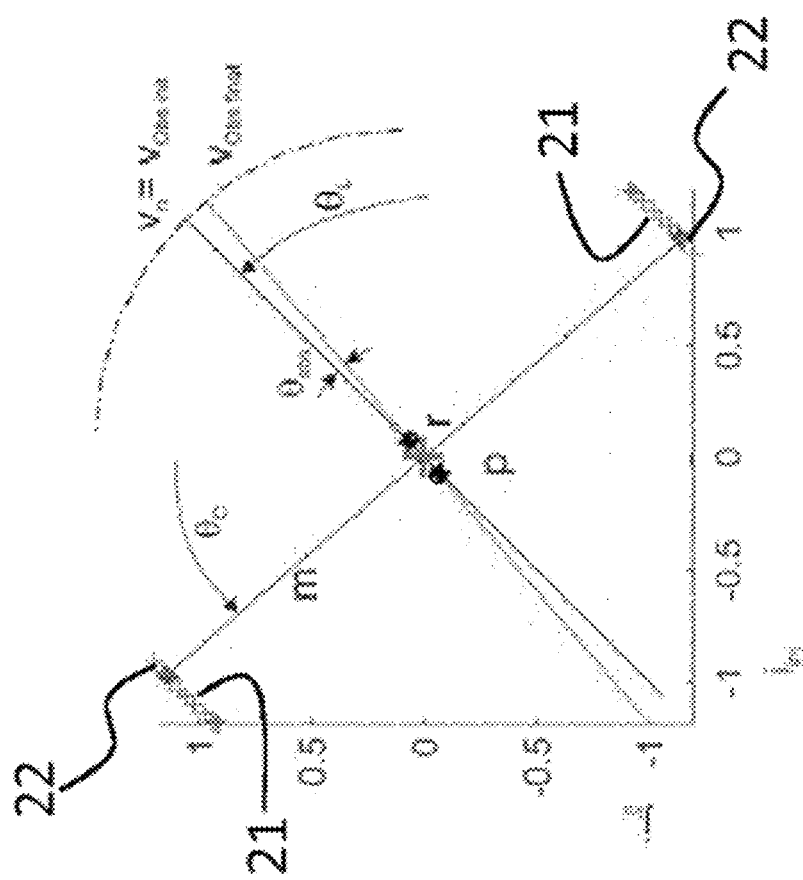
FIG. 12a represents a procedure of estimation of the threshold of perception of a minimal movement defined by a rotation in the coordinate system of P1.

In the plane P1, an adaptive procedure is used to estimate the threshold $\theta_{obs}$ as shown in FIGS. 12a and 12b. The adaptive procedure functions as follows. Random values for $\theta_{obs}$ are chosen in an interval [−0.2; 0.2], which makes it possible to define the coordinate system (p, i, j) based on the coordinate system (p, $i_{ini}$, $j_{ini}$) as shown in FIG. 11a. The stimulus is then displayed in the new coordinate system (p, i, j) and the observer is asked to give the direction of movement that they perceive. According to the value of a parameter d∈{−1,+1} and the perceived direction of movement, the observer's responses are displayed either in red 21 on the y-axis 1 in FIG. 12b, or in green 22 on the y-axis 0 in FIG. 12b. At the end of ten tests 20 a nonlinear least-squares estimation is carried out which gives a psychometric function 23:

$$f(\theta) = 1 \Big/ \left(1 + e^{-\frac{(\theta - \theta_{obs})}{\sigma}}\right) \qquad (1044)$$

The psychometric function 23 is used for optimizing the running of the following tests 20 with the objective of estimating as rapidly as possible a threshold 24 of minimum movement. In the case shown, thirty tests are sufficient for a good estimation of the threshold.

In FIG. 12a, $v_n = v_{Obs\ init} = v$ the vector normalized at one of $V_{abc}$; $v_{Obs\ final}$ is i+j at the threshold of minimum movement.

Figure 11B:
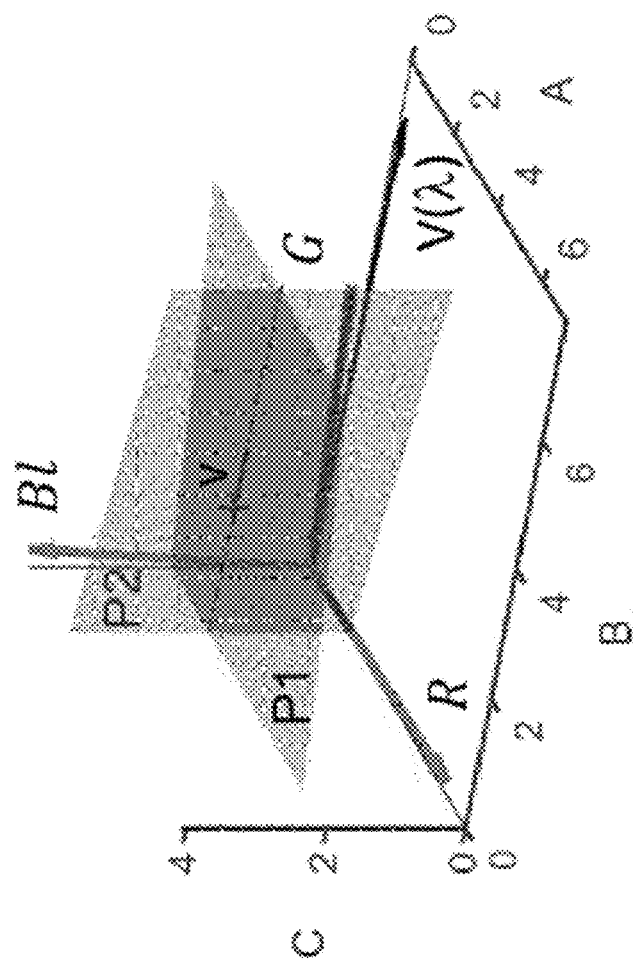
FIG. 11b represents a plane P2 colinear with the direction of a minimal movement perceived in P1.

Once the direction of the minimum movement in the plane P1 has been estimated, a plane P2 is constructed, as shown in FIG. 11b, colinear with the direction of minimum movement in P1 and colinear with the vector [0 0 1]. In the plane P2, the same protocol is used to determine the direction of the minimum movement. In the plane P2, the colours of the stimulus will be blue and yellow instead of red and green.

When the measurement of the minimum perceived movement in P1 and in P2 has been carried out, it is possible to reconstruct a three-dimensional luminance vector V originating from the point p for a given observer.

The following step of the method according to the invention is the third step 4 of construction of a hyperbolic space representative of the colour vision space of the observer facing the display unit.

Figure 13B:
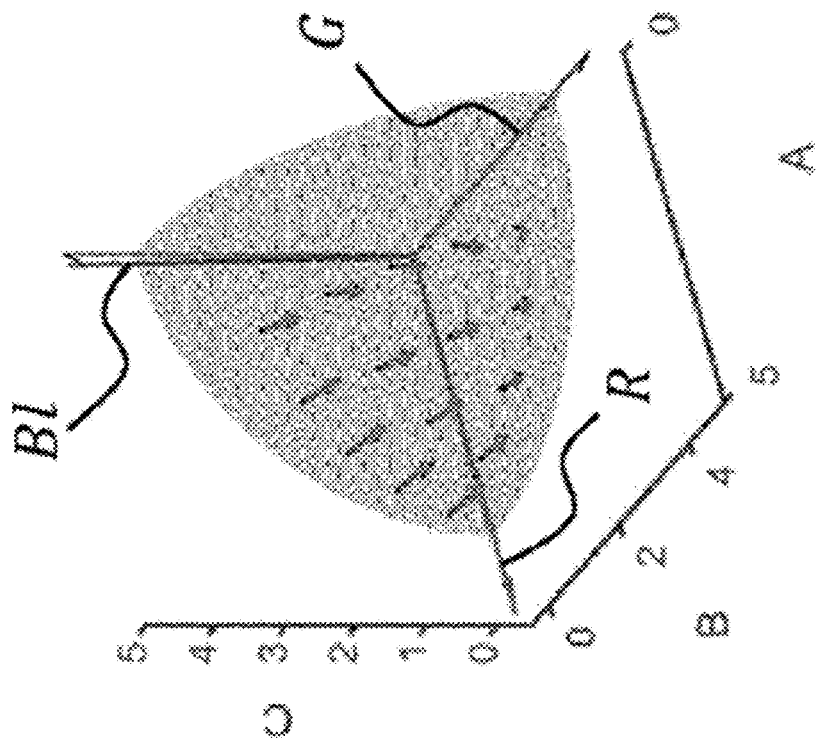
FIG. 13b represents a result of measurement of a luminance vector field for a first observer, on fifteen measurement points distributed over a sphere of radius four in the coordinate system ABC.
Figure 13A:
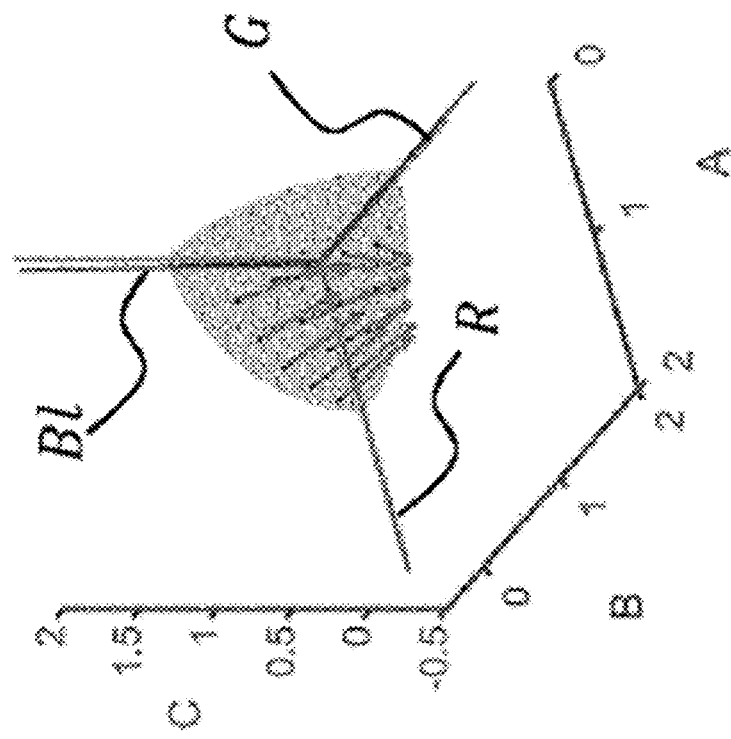
FIG. 13a represents a result of a measurement of a luminance vector field for a first observer, on fifteen measurement points distributed over a sphere of radius unity in the coordinate system ABC.

It is possible for example to use the above procedure to associate a luminance V, viewed by an observer, with several points p of the display unit in the space ABC. To this end, several points in the space ABC may be chosen. These points can be chosen on a sphere of radius k. For example, it is possible to choose N' points distributed uniformly over the surface of the sphere of radius k. Let $P_k$ be the matrix of these points. A measurement of the direction of luminance is associated with each of these points. Let $V_k$ be the matrix containing the set of luminance direction vectors. The matrices $P_k$ and $V_k$ are then of size 3×N' for a measurement radius k of the sphere. The measurements can be multiplied for several radii of spheres, for example, of K different radii. FIGS. 13a, 13b represent a set of these measurements for N'=15 points on a sphere of radius one and four in ABC. In FIGS. 13a, 13b, the points represent the coordinates of the points p and the arrows, the directions of V. FIG. 13b shows the measurements for N'=15 points on the sphere of radius four. It can be clearly observed that the vectors starting from the points p and with direction V form a convex vector field, since the arrows seem to point towards one and the same direction in FIGS. 13a and 13b.

The convex vector field can be modelled by an equation of the type:

$$V_k(x) = A_k x + x_{0k} \qquad (1045)$$

with:

$$A_k = V_1 P_1 (P_1 P_1^T)^{-1}$$

$$x_{0k} = \overline{V} - A_k \overline{P}$$

where x is here a coordinate of a point in the space ABC and $x_0$ a coordinate of the origin of the luminance vector field $V_k(x)$. $V_1 = V_k - \overline{V}$ and $P_1 = P_k - \overline{P}$ where $\overline{P} = E_k\{P_k\}$, $\overline{V} = E_k\{V_k\}$ are the means of the matrices $V_k$ and $P_k$ along N' points, $E_k$ representing the expected value. The matrix $A_k$ and the vector $x_{0k}$ are the parameters of the vector field for a set of measurements on a sphere of radius k in ABC. By choosing other measurement points, different parameters are obtained: even if these other points produce another vector field, the latter is however close to the first vector field as shown in FIG. 13a. Similarly, viewing the development of the parameters with the radius of the sphere, the development thereof is small. It may be of interest to monitor the specific nature of the observer's vision as a function of the light levels, while keeping a parameter k fixed, in order to reproduce, with an affine model of the vector field $V_k$ or model of the observer: a set of measurements for several different sphere radii. In the affine model of the vector field $V_k$, it is possible to include variations of the model according to the spatial $f_x$ and temporal $f_t$ frequencies of the stimulus, the eccentricity e of the stimulus on the retina, the display unit E, the observer O. Thus, the parameters of the measured luminance vector field $V_k$, for the observer viewing the display unit, with a stimulus of eccentricity, spatial and temporal frequencies can be expressed: $A_\mu$ and $x_{0\mu}$ with $\mu=(k, f_x, f_t, e, E, O)$ the set of parameters. The parameter of the display unit E is a Euclidean primary set ABC of the display unit, a Euclidean primary set ABC groups together the spectral functions ABC that characterize a particular screen. For a given observer on a given display unit, based on measurement points produced by varying all the other parameters, it is possible to predict the vector field for any value within these parameters, by interpolation. In other words, if the stimulus is set for example by spatial, temporal frequency, extent of the stimulus, a first vector field is obtained. But if these parameters are changed, a second vector field is obtained that may differ from the first vector field. It is therefore possible to parametrize the vector field as a function of the measurement conditions and to interpolate the vector field between these measurements.

Unless otherwise stated, throughout the following, the observer, the display unit, the eccentricity and the frequencies are given. Only the radius of the measurement sphere is variable.

Figure 13D:
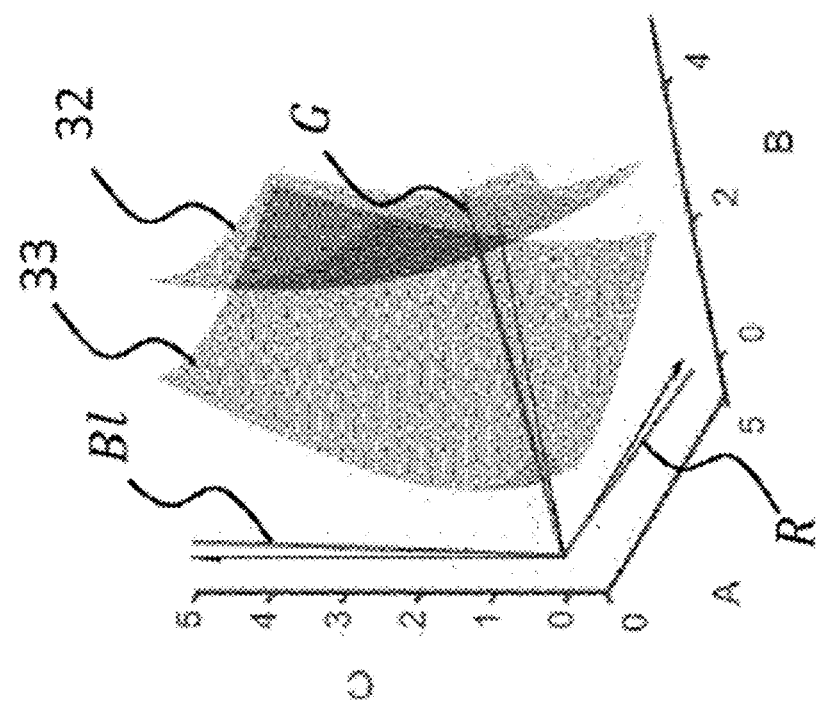
FIG. 13d represents surfaces of constant luminance for a second observer in the coordinate system ABC.
Figure 13C:
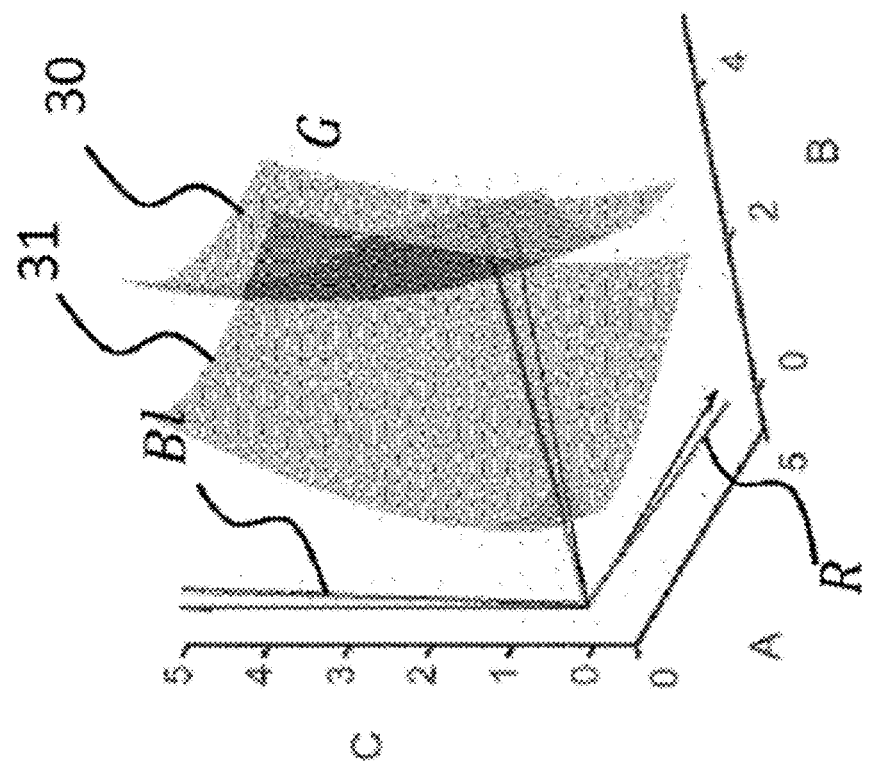
FIG. 13c represents surfaces of constant luminance for the first observer in the coordinate system ABC.

It is possible to calculate a surface of constant luminance based on the vector field. This surface is given by:

$$x^T \cdot V_k(x) = x^T A_k x + x^T x_0 = k \quad (1046)$$

wherein the scalar product is given by the Euclidean scalar product in the space ABC of the display unit E. For the example, FIG. 13c represents surfaces of constant luminance 30, 31 corresponding respectively to k=1 and k=4, for a first observer in the coordinate system ABC and FIG. 13d represents surfaces of constant luminance 32, 33 for k=1 and k=4 for a second observer in the coordinate system ABC.

The measurements show that the vector fields are identical, regardless of the radius of the sphere on which are placed the points about which the vector field is measured. That is to say that $A_k$ can be expressed as $A_k = A/k$. It follows that the relationship (1046) becomes:

$$x^T A x + k x^T x_0 = k^2 \quad (1047)$$

Which can also be expressed as:

$$z^T \mathcal{J} z = k^2 \quad (1048)$$

With:

$$\mathcal{J} = \begin{bmatrix} -1 & 0 & 0 \\ 0 & -1 & 0 \\ 0 & 0 & 1 \end{bmatrix} \quad (1049)$$

$$z = T^{-1}(x + t0) = \frac{1}{\rho}\sqrt{|S|}\, U^T\left(x + \frac{k}{2}A^{-1}x0\right),$$

$$T^{-1} = \frac{1}{\rho}\sqrt{|S|}\, U^T, \quad t0 = \frac{k}{2}A^{-1}x0 \quad (1050)$$

$$A = U\sqrt{|S|}\, \mathcal{J} \sqrt{|S|}\, U^T \text{ and } \rho^2 = 1 + \frac{1}{4}x0^T A^{-1} x0 \quad (1051)$$

Where U and S are respectively the matrix of the vectors and of the specific values of A.

The inverse transformation is given by:

$$x = Tz - t0 = \rho U(\sqrt{|S|})^{-1} x \frac{k}{2} A^{-1} x0 \quad (1052)$$

The parameters of the vector field make it possible to fully define the transformation of the space ABC of variable x into a hyperbolic space of variable z, composed of two-dimensional hyperboloids infinitely stacked on one another.

Thus, if the hyperboloid is defined in the hyperbolic space of variable z by the equation:

$$z^T \mathcal{J} z = 1, \text{ i.e. } z = \begin{bmatrix} \sinh(t)\cos(\theta) \\ \sinh(t)\sin(\theta) \\ \cosh(t) \end{bmatrix} \quad (1053)$$

This hyperboloid can be represented in the space of x by the relationship (1052). Thus x represents the coordinates in the space ABC of the hyperboloid defined in the space of z.

Figure 14:
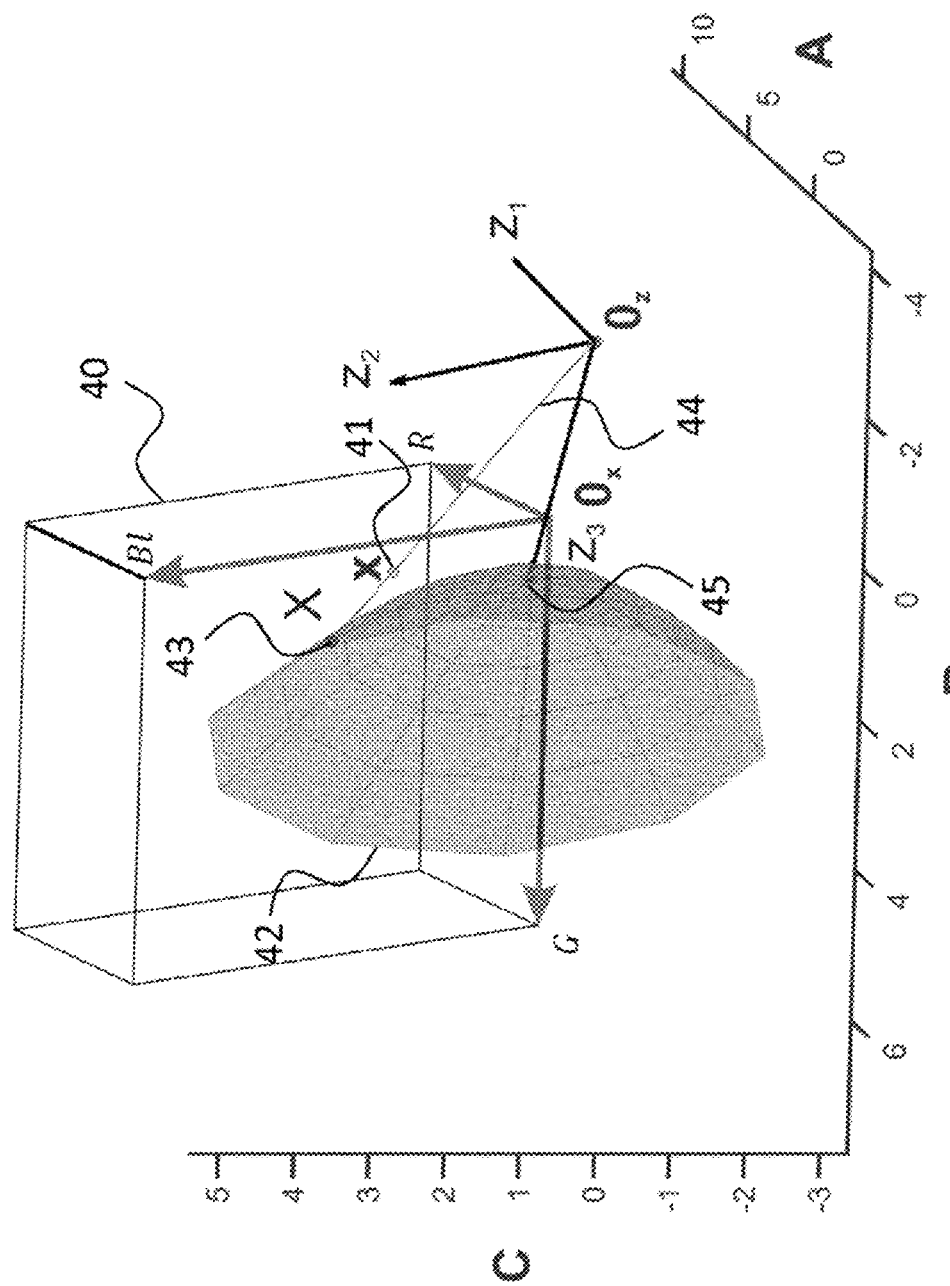
FIG. 14 represents an example of joint representation of the screen space and the observer space within a common space ABC.

FIG. 14 presents an example of a joint representation of the screen space and the observer space within a common space ABC. The screen is materialized by a cube 40 having colours that the screen can produce with phosphors materialized by the vectors R, G and B and the origin $0_x$. The observer is materialized by the hyperbola 42 having a centre 45 and axes $z_1$, $z_2$, $z_3$, in the centre coordinate system $0_z$.

Taking the equation (1048) and replacing z with the expression (1050) thereof as a function of x, it is possible to obtain a representation of the hyperboloids of radius k in the space ABC.

$$z^T \mathcal{J} z = k^2, z = T^{-1}(x + t0)$$

$$(x+t0)^T (T^{-1})^T \mathcal{J} T^{-1}(x+t0) = k^2 \quad (1054)$$

Assuming, $$X = x/k, X0 = t0/k \text{ and } R = (T^{-1})^T \mathcal{J} T^{-1} \quad (1055)$$

this gives:

$$(X+X0)^T R (X+X0) = 1 \quad (1056)$$

This equation represents for X+X0 in the coordinate system ABC, the hyperboloid of radius k=1, following the metric R.

That is to say that for X=x/k, the metric is fully represented by a hyperboloid of radius k=1 and the metric produced by R and X0 in ABC. Reciprocally, it is sufficient to project x on the hyperboloid of radius k=1 following x=kX, to obtain the point X corresponding to x and the value of k.

FIG. 14 represents a projection of a first point 41 of the space ABC on a hyperboloid 42 of radius one on a second point 43 following the direction X=x/k represented by a straight line 44.

It is therefore possible to transform any point of the space ABC into the space of the hyperboloid of radius 1. It is necessary first to project the point x on the hyperboloid of radius 1 in order to obtain X. Then X follows a metric given by the equation (1056).

In other words, it is possible to associate with the space ABC the metric of the observer, which is a hyperbolic metric in the space z and which is expressed by R and X0 in the space ABC. It is thus possible to know the position of all the points of the screen in the hyperbolic space of the observer.

Each point $x=[x_a, x_b, x_c]^T$ of the space of the screen ABC can thus be transformed into coordinates linked to the metric of the observer, following the parameters (k, t, θ).

$$z = \begin{bmatrix} k\sinh(t)\cos(\theta) \\ k\sinh(t)\sin(\theta) \\ k\cosh(t) \end{bmatrix} \quad (1057)$$

With $$k = \sqrt{(x+X0)^T R(x+X0)}, \quad (1058)$$

$$Z = \frac{z}{k} = T^{-1}\left(\frac{x}{k} + X0\right) = \begin{bmatrix} z_1 \\ z_2 \\ z_3 \end{bmatrix}, \quad (1059)$$

$$t = \text{arccosh}\left(\frac{z_3}{k}\right), \theta = \arctan\left(\frac{z_2}{z_1}\right). \quad (1060)$$

A correction of an image for an observer can for example, consist of modifying the values of k. For example, if k=1 is forced for the set of points of an image, then the observer will have the opportunity to gaze at the colours of the image, but their visual system as a whole will be in constant adaptation mode, which should reduce visual fatigue.

In summary, the conversion of a digital image so that it corresponds to a particular observer is thus given by the following set of operations:

Constructing a hyperbolic space of the observer in the space ABC of the screen. This space being given by T and t0 according to the equation (1050).

Converting the points x of the image in the space ABC into points z, said conversion being parametrized by (k, t, θ) according to the equations (1058), (1059), (1060).

Modifying the parameter k, either by setting it at a constant, for example for adaptation to a level of constant luminance of the observer, or by reducing the variance thereof, for example for a reduction in the adaptation difference between the different regions of the image.

Figure 15:
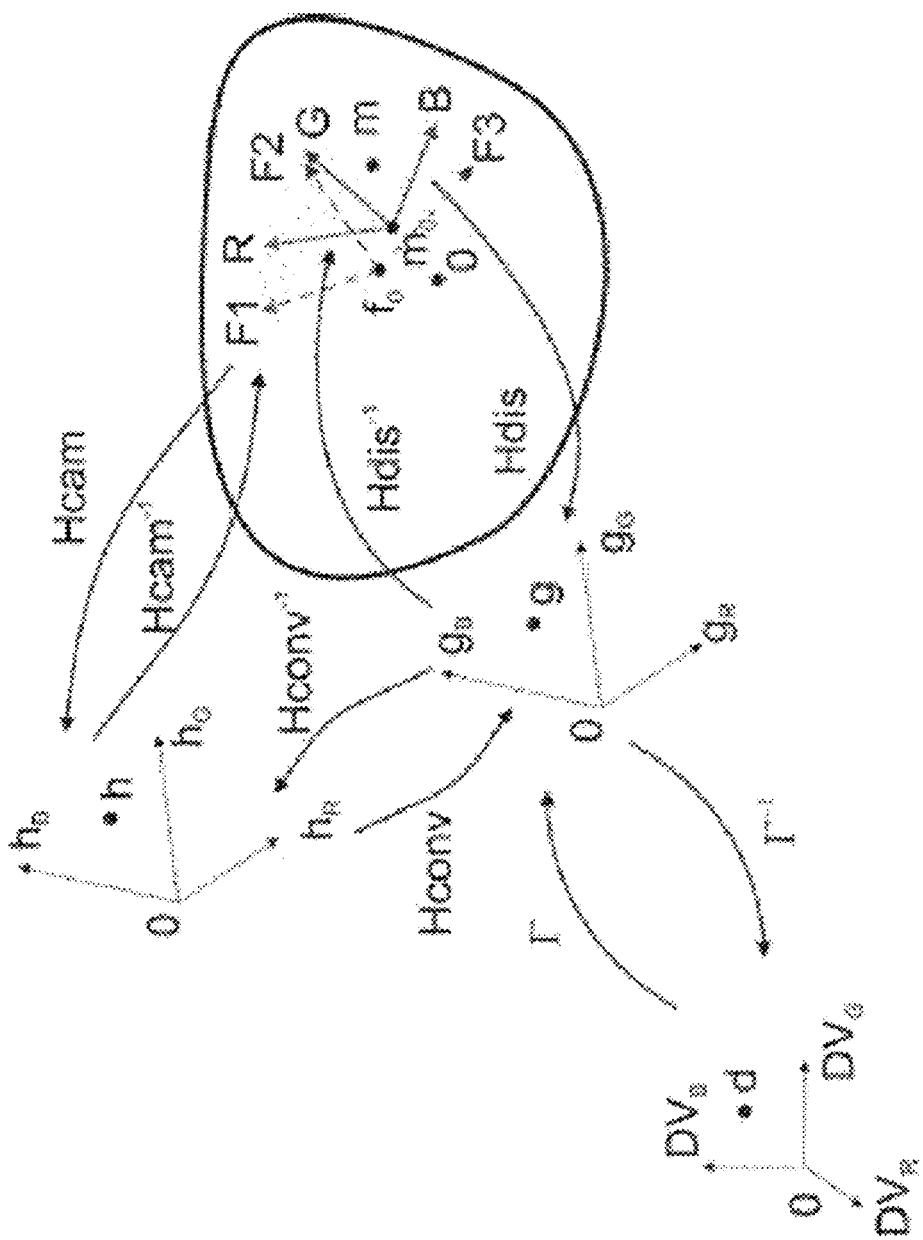
FIG. 15 represents a diagram of conversion between a radiance space of a scene, a gain space of a camera, and a gain space of a display unit.

By way of example, a conversion model of a system composed of a camera and a display unit is described. This model makes it possible to reproduce as faithfully as possible the spectral radiance of a scene, acquired by the camera, and displayed by the display unit. FIG. 15 represents a diagram of conversion between the radiance space of the scene, the gain space of the camera ($h_R$, $h_G$, $h_B$), and the gain space of the display unit ($g_R g_G g_{Bl}$) A spectral radiance m is acquired by a camera with spectral sensitivities $F_1$, $F_2$, $F_3$ that are also vectors in the RGB light space. The data acquired by the camera can be represented as a gain of a spectral function of origin $f_0$ and gain K'.

Let $F=[F_1\ F_2\ F_3]$ be a matrix of size $n_\lambda \times 3$, which contains the spectral sensitivity functions of the camera. These functions are composed of the spectral function of the optical path of the camera, the optical spectral transmission of the colour filters, the photoelectron conversion by the electronic system. The optical path of the camera can be composed of lenses, microlenses, birefringent filter, infrared cut-off filter.

The spectral sensitivity functions of the camera form the analysis primaries of the spectral radiance of the scene and it is possible to transfer the gain of these primaries into a gain space. It is assumed that the camera is adjusted such that the minimum of the radiances of the scene corresponds to the gain zero and that the maximum of the radiances of the scene corresponds to the gain one. This adjustment can be provided by a modification of the black level $f_0$ and of the integration time K" of the camera. The model of the camera can be expressed as a homography between the homogenous coordinates of the radiance and the homogenous coordinates of the gain.

Let $zo=[z(\lambda)\ 1]^T$ be the homogenous coordinate of a spectral radiance of the scene $z(\lambda)$. The gains $go=[g_{F1}, g_{F2}, g_{F3}, s]^T$ can be calculated as follows:

$$go = H_{cam} zo \text{ with } H_{cam} = \begin{bmatrix} F & | & -f_0 \\ 0\ 0\ 0 & | & K \end{bmatrix}, \quad (1063)$$

$$H_{cam}^{-1} = \begin{bmatrix} (F^T F)^{-1} F^T & | & (F^T F)^{-1} F^T f_0 \\ 0\ \ldots\ 0 & | & 1/K \end{bmatrix},$$

$$g = [g_{F1}, g_{F2}, g_{F3}] = [g_{F1}, g_{F2}, g_{F3}, 1] = go/s$$

Similarly, it is possible to define a model of the display unit as a homograph $H_{dis}$ based on the equation (1003):

$$H_{dis} = \begin{bmatrix} M & | & m_0 \\ 0\ 0\ 0 & | & 1 \end{bmatrix}, \quad (1064)$$

$$H_{dis}^{-1} = \begin{bmatrix} (M^T M)^{-1} M^T & | & -(M^T M)^{-1} M^T m_0 \\ 0\ \ldots\ 0 & | & 1 \end{bmatrix}$$

The homograph for conversion $H_{conv}$ between the gains of the camera and the gains of the display unit is given by:

$$H_{conv} = H_{cam}^{-1} H_{dis}, \text{ and } H_{conv}^{-1} = H_{dis}^{-1} H_{cam} \quad (1065)$$

By having available a system for conversion between the digital data of a camera and those of a display unit, it is possible to convert any item of data from one space to another, regardless of whether it is of the colour type, ABC or camera RGB or display unit RGB, or even of a spectral type such as a spectral radiance based on monochromatic wavelengths.

The model of the observer is considered as a spectral sensitivity, in a hyperbolic space. That is to say that the observer space is a three-dimensional convex affine space provided with a hyperbolic metric $\mathbb{H}^3$ that can be immersed in a four-dimensional Euclidean space: $\mathbb{R}^4$.

A change of variable between the measurement space ABC and the hyperbolic space of the observer $y=[y_1, y_2, y_3]$ corresponds to each observer, which explains the variations of perception between individuals.

A space y is defined using the space ABC in which the observer's measurements are carried out. The suitable change of variable in order to immerse the surface of constant luminance in the hyperbolic space $\mathbb{H}^3$ is to be determined subsequently.

The hyperbolic space $\mathbb{H}^3$ has available a metric that can be transformed into a Euclidean metric by considering an additional dimension, $\mathbb{R}^4$. The model of the hyperboloid gives the projections φ and the inverse projection thereof as transformation of the space $\mathbb{H}^3$ into $\mathbb{R}$.

Figure 16:
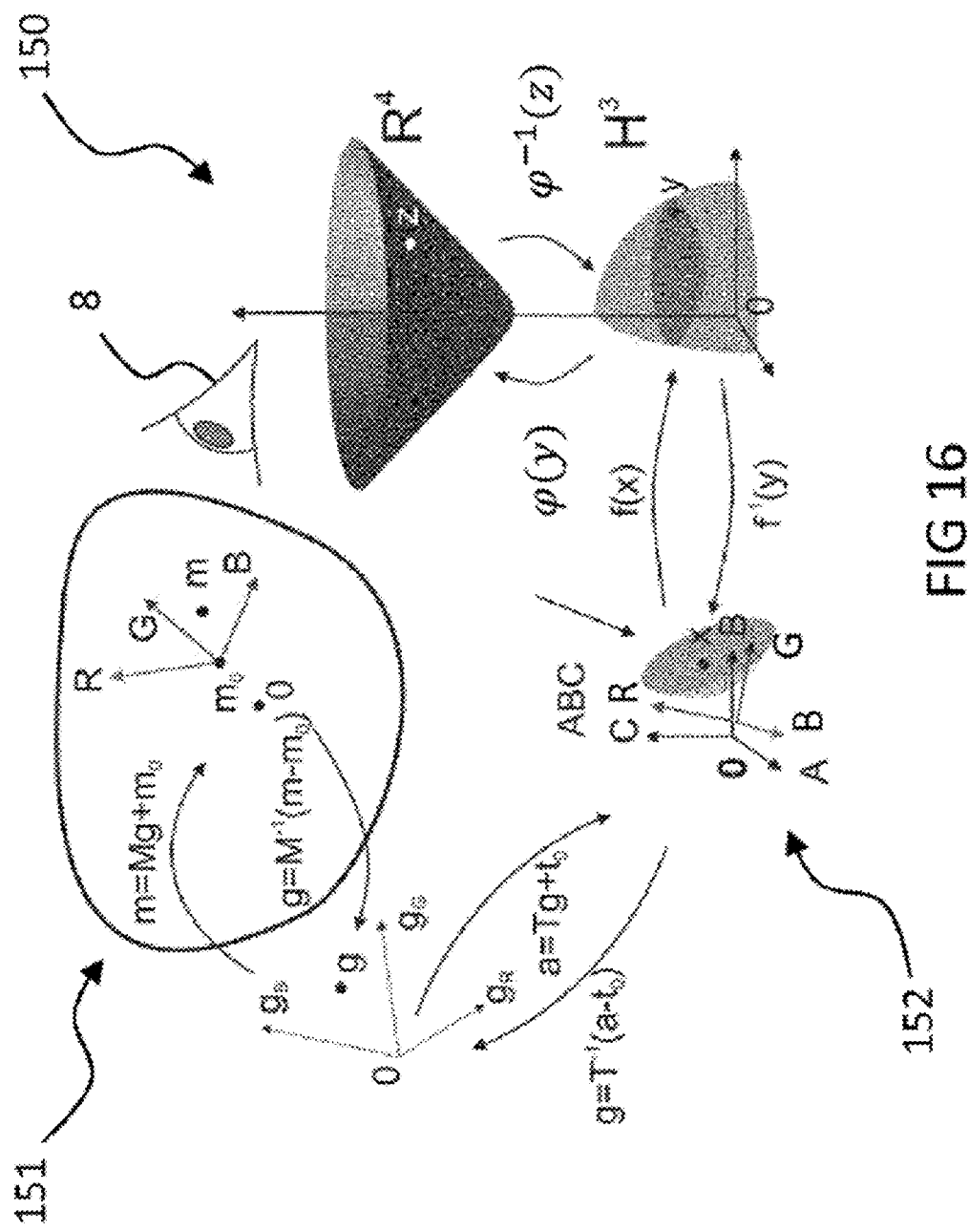
FIG. 16 represents a general model of transformation between the display unit and the observer.

The general model of transformation between the display unit and the observer is shown in FIG. 16.

FIG. 16 represents the space of the observer 30 facing the space of the lights produced by the display unit 31. Based on the space of the display unit 31, the space ABC is produced by orthogonalization. In the space ABC, the surfaces of constant luminance for the observer are measured, which makes it possible to determine the change of variable f from the space ABC to the space $\mathbb{H}^3$. Then, the metric is imposed by $\mathbb{R}^4$, and there is projection of either y on z, or z on y via the projection φ and the inverse thereof.

The transformation between $\mathbb{R}^4$ and $\mathbb{H}^3$ makes it possible to explain the formation of a surface of constant luminance in the hyperbolic space $\mathbb{H}^3$. For example, a deviation in the direction of luminance in the space ABC corresponds to a certain deviation in the hyperbolic space $\mathbb{H}^3$ that will be $z_2$ 30 determined by a uniform displacement over the coordinates $z_1$, $z_2$ and $z_3$ of the space $\mathbb{R}^4$. It is then possible to express:

$$dx = g(dz) \text{ with} \tag{1066}$$

$$dz = \begin{bmatrix} d \\ d \\ d \\ \sqrt{(z_1+d)^2 + (z_2+d)^2 + (z_3+d)^2 + 1} \end{bmatrix}$$

and $g(dz) = F \Im \, dz$ where $$F = \left[\frac{\partial f_j(x_i)}{\partial x_i}\right], \Im = \left[\frac{\partial \varphi(y_i)}{\partial y_i}\right]$$

are the Jacobians of the transformations f and φ. dx then describes a vector sub-space that can be compared to the measurements of the surface of constant luminance in the space ABC.

The different embodiments of the present invention comprise various steps. These steps can be implemented by machine instructions executable by means of a microprocessor for example.

Alternatively, these steps can be carried out by specific integrated circuits comprising a wired logic for executing the steps, or by any combination of programmable components and customized components.

The present invention can also be provided in the form of a computer program product that can comprise a non-transient computerized memory media containing instructions executable on a computerized machine, these instructions being capable of being used to program a computer (or any other electronic device) for executing the procedures.

The present invention presents different advantages according to the fields of application thereof:
the invention makes it possible to define calculation rules in order to evaluate the quality of the images and the appearance models according to a human perception of these latter;
advantageously, the invention allows an improvement in the visual quality of human-machine interfaces and an adaptability to several different observers;
it is also possible advantageously to apply the invention to artificial or augmented reality systems in order to promote the integration of the observer facing the display unit by using a vision model corresponding to the observer.

The industrial applications of the invention are very extensive. Considering, as is commonplace, a mean model observer originating from an average of observers of a given region of the world for example, it is possible to envisage applications in the field of the prediction of a colour appearance in the textile or paint field.

It is also possible to find an application in the field of optimization of phosphors or coloured filters of multimedia display systems.

Another application may be in the field of the optimization of an acquisition and restoration loop of colour digital and analogue imaging, such as film photography or digital photography.

Finally, it is possible to apply the invention to the creation of extra-human avatars having properties of perception in the fields of wavelengths beyond the electromagnetic field visible by a human being.

The invention claimed is:

1. A method implemented by a computer, for the construction of a colour space specific to an observer viewing a colour image on a display device connected to said computer, and for correcting digital images as a function of the colour space, the method comprising at least the following steps:
a first step of measuring spectral radiances emitted by the display device and captured by a radiance measurement device;
a second step of constructing an affine model of the lights produced by the display device in an orthogonal Euclidean colour space of the display device based on the measurements of spectral radiances;
a third step of measuring a luminance vector field perceived by the observer placed in front of the display device and subjected to a stimulus defined in the orthogonal Euclidean colour space of the display device, the step of measuring the luminance vector field perceived by the observer placed in front of the display device is carried out by a computer equipped with an interface between the computer and the observer and connected to the display device, said computer implementing a method of a "minimum motion photometry" type applied to the observer to whom a stimulus is presented, defined in the orthogonal Euclidean colour space of the display device;
a fourth step of constructing a hyperbolic space representing a colour vision space specific to the observer placed in front of the display device based on the measured luminance vector field, the luminance vector field being determined for several points distributed on a sphere of radius k or several spheres of different radii in orthogonal Euclidean space, a surface of constant luminance being determined from the vector field, and the surface of constant luminance taking the form of a hyperboloid in the Euclidean colour space and therefore defining a hyperbolic space z;
determining a conversion function in that each point $x=[x_a, x_b, x_c]^T$ of the orthogonal Euclidean colour space of the display device is transformed into points $z=[z_1, z_2, z_3]^T$ in the hyperbolic space of the observer, a luminance vector Z being defined with parameters (k,t,θ), such that:

$$k = \sqrt{(x-X0)^T R(x-X0)}$$

$$z = \begin{bmatrix} k\sinh(t)\cos(\theta) \\ k\sinh(t)\sin(\theta) \\ k\cosh(t) \end{bmatrix} \text{ with}$$

$$t = \operatorname{arccosh}\left(\frac{z_3}{k}\right); \theta = \arctan\left(\frac{z_2}{z_1}\right)$$

presenting a compensation of the image on the display device by fixing the parameter k to a constant value for all points of the image or by reducing the variance of the parameter k.

2. The method according to claim 1, wherein the spectral radiance measurements are carried out for several digital values DV representing instructions given to the display device by a graphics card present in the computer, said instructions making it possible to display an image on each colour channel of the display device, said affine model of the lights produced by the display device is defined as a function of the digital values DV and gain values of the display device.

3. The method according to claim 2, wherein the second step of constructing an affine model comprises:
   a step of calculating prototype functions of the display device for each colour channel, as a function of the measured spectral radiances;
   a step of calculating the gains of the display device, for each colour channel, as a function of the measured spectral radiances;
   a step of interpolating the gains for each colour channel of the display device, between the values of the measured spectral radiances; and
   a step of determining a nonlinear vector function from the space of the digital values DV to the space of the gains of the display device.

4. The method according to claim 3, wherein the calculation of the prototype functions is carried out by a method from among:
   use of the maximum values of the radiance measurements on each colour channel; and
   rank-one decomposition into singular values and vectors of a matrix composed of the values of the spectral radiance measurements for each colour channel.

5. The method according to claim 1, wherein the step of transformation of the orthogonal Euclidean colour space into an affine space is carried out by a method from among:
   a first method called by decorrelation;
   a second method by canonical spectral projection;
   a third method called Gram-Schmidt method; and
   a fourth method by decomposition into singular values.

6. The method according to claim 1, wherein the first measurement step is implemented by a spectrophotometer.

7. The method according to claim 1, wherein the parameter k is adapted by setting it to a constant value in order to carry out an adaptation of the image presented by the display device at a constant luminance level for the observer placed in front of the display device.

8. The method according to claim 1, wherein the parameter k is adapted by reducing the variance thereof in order to diminish the adaptation of the observer to the luminance difference between the different regions of the image.

9. A device for measuring a colour space specific to an observer and for correcting digital images as a function of the colour space specific to the observer, comprising:
   a display device for displaying a colour image;
   a measuring device for measuring a spectral radiance emitted by the display device; and
   a calculating device for calculating a colour space specific to an individual based on the measured spectral radiance and the displayed colour image, the calculating device comprising at least: a calculation processor, a device for recording and storing data, an interface with the measurement device and an interface with the display device, an interface with the observer, and the calculating device implementing a method for correcting digital images according to claim 1.

10. A non-transitory computer program product comprising instructions which, when the program is executed by a computer, control the latter to implement the steps of the method for correcting images according to claim 1.

11. A non-transitory computer-readable recording media comprising instructions which, when they are executed by a computer, control the latter to implement the steps of the method for correcting images according to claim 1.

* * * * *